United States Patent
Kazmi

(10) Patent No.: US 9,066,242 B2
(45) Date of Patent: Jun. 23, 2015

(54) METHOD AND DEVICE FOR DISTINGUISHING BETWEEN RELAY TYPES

(75) Inventor: Muhammad Ali Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 336 days.

(21) Appl. No.: 13/643,270

(22) PCT Filed: Oct. 17, 2011

(86) PCT No.: PCT/SE2011/051242
§ 371 (c)(1),
(2), (4) Date: Oct. 24, 2012

(87) PCT Pub. No.: WO2012/096611
PCT Pub. Date: Jul. 19, 2012

(65) Prior Publication Data
US 2013/0040558 A1    Feb. 14, 2013

Related U.S. Application Data

(60) Provisional application No. 61/432,766, filed on Jan. 14, 2011.

(51) Int. Cl.
| H04B 1/60 | (2006.01) |
| H04W 16/26 | (2009.01) |
| H04B 7/155 | (2006.01) |
| H04W 24/10 | (2009.01) |
| H04W 36/00 | (2009.01) |
| H04W 84/04 | (2009.01) |

(52) U.S. Cl.
CPC .............. *H04W 16/26* (2013.01); *H04W 24/10* (2013.01); *H04W 36/0072* (2013.01); *H04W 84/047* (2013.01); *H04B 7/15507* (2013.01)

(58) Field of Classification Search
CPC .................................................. H04B 7/15507
USPC .................. 455/9, 7, 11.1, 522, 69, 41.2, 436
See application file for complete search history.

(56) References Cited

U.S. PATENT DOCUMENTS

| 2007/0242647 | A1* | 10/2007 | Bennett .......................... 370/338 |
| 2010/0260096 | A1 | 10/2010 | Ulupinar et al. |
| 2012/0003962 | A1 | 1/2012 | Jeon et al. |

FOREIGN PATENT DOCUMENTS

WO    2010123279 A2    10/2010

OTHER PUBLICATIONS

3rd Generation Partnership Project, "Evolved Universal Terrestrial Radio Access (E-UTRA) and Evolved Universal Terrestrial Radio Access Network (E-UTRAN); Overall description; Stage 2," Technical Specification Group Radio Access Network, 3GPP TS 36.300 V9.6.0 (Dec. 2010), (Release 9).

3rd Generation Partnership Project, "Evolved Universal Terrestrial Radio Access (E-UTRA); Relay radio transmission and reception," Technical Specification Group TSG RAN; 3GPP TR 36.826 V0.10.0 (Aug. 2011), (Release 11).

3rd Generation Partnership Project, "Evolved Universal Radio Access (E-UTRA); Further advancements for E-UTRA physical layer aspects," Technical Specification Group Radio Access Network; 3GPP TR 36.814 V9.0.0 (Mar. 2010), (Release 9).

* cited by examiner

*Primary Examiner* — Sanh Phu
(74) *Attorney, Agent, or Firm* — Coats & Bennett, P.L.L.C.

(57) ABSTRACT

The embodiments herein relate to a method in a target node (501, 520) for handling capabilities of a wireless relay (510) in a communications network (500). The target node (501, 520) receives, from the wireless relay (510), information indicating a capability of the wireless relay (510). The information indicates whether the wireless relay (510) is fixed or movable. Based on the received information, the target node (501, 520) determines a procedure to be executed, which procedure is dependent on whether the wireless relay (510) is fixed or movable.

70 Claims, 14 Drawing Sheets

METHOD AND DEVICE FOR DISTINGUISHING BETWEEN RELAY TYPES

TECHNICAL FIELD

Embodiments herein relate generally to a first network node and a method in the first network node, and to a wireless relay and a method in the wireless relay. More particularly the embodiments herein relate to handling of capabilities of the wireless relay in a communications network.

BACKGROUND

In a typical cellular network, also referred to as a wireless communication system, User Equipments (UEs), communicate via a Radio Access Network (RAN) to one or more core networks (CNs).

A user equipment is a mobile terminal or mobile station by which a subscriber may access services offered by an operator's core network and services outside operator's network to which the operator's RAN and CN provide access. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server. In the following, the term user equipment is used.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The radio access network covers a geographical area which is divided into cell areas, with each cell area being served by a base station, e.g. a Radio Base Station (RBS), which in some radio access networks is also called evolved NodeB (eNB), NodeB, B node, base station or Base Transceiver Station (BTS), depending on the technology and terminology used. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

In some versions of the radio access network, several base stations are typically connected, e.g. by landlines or microwave, to a Radio Network Controller (RNC), as in $3^{rd}$ Generation (3G), i.e. Wideband Code Division Multiple Access (WCDMA). The radio network controller supervises and coordinates various activities of the plural base stations connected thereto. In $2^{nd}$ Generation (2G), i.e. Global System for Mobile Communications (GSM), the base stations are connected to a Base Station Controller (BSC). The network controllers are typically connected to one or more core networks.

A relay node (RN), or just simply relay, in a wireless communication network is used to receive and re-transmit/forward signals intended for mobile stations, in a mobile network, i.e. for user equipments in a communications network. A mobile station may be referred to as user equipment in Third Generation Partnership Project (3GPP) terminology. A number of user equipments may be served by a single relay node. A key objective of the relay node is to enhance the radio access coverage in both the UpLink (UL), i.e. user equipment to base station transmissions, and DownLink (DL), i.e. base station to user equipment transmissions. A relay node may be positioned between a base station and a user equipment so that transmissions between the base station, referred to as the donor base station, and the user equipment are relayed by the relay node.

The relay node connectivity or architecture in Long Term Evolution (LTE) networks is described in 3GPP. In LTE the relay connectivity or architecture comprises:
 relay node connected wirelessly to a donor cell of a donor eNode B (DeNB) via the radio backhaul link, and
 user equipments connect to the relay node via the radio access link.

FIG. 1 depicts a communications network 100 illustrating the connection between different nodes when a relay node 103 is used, i.e. it illustrates a single hope relay architecture in the communications network 100. The relay node 103 is connected wirelessly to a donor cell of a donor eNode B 105 via a radio backhaul link 104, and UEs 107 are connected to the relay node 103 via a radio access link 108. In LTE, the radio backhaul link 104, i.e. DeNB-relay node link, and the radio access link 108, i.e. relay node-UE link, are termed the Un and Uu interfaces, respectively. The relay architecture shown in FIG. 1, illustrates that the eNB 105 connects to the LTE Evolved Packet Core (EPC) 110.

The relay node 103 connects to the DeNB 105 via the Un interface using the same radio protocols and procedures as used by the UE 107 for establishing a connection to an eNB 105. During the Radio Resource Control (RRC) connection setup phase, the relay node103 signals an RN indicator to the DeNB 105. The RRC is a protocol which handles the control plane signaling of Layer 3 between the UEs 107 and the Universal Terrestrial Radio Access Network (UTRAN). Based on the received RN indicator, the DeNB 105 executes certain functions which are specific to the relay operation. For instance the DeNB 105 selects the relevant core network node, i.e. a Mobility Management Entity (MME) in LTE, which is capable of supporting the relay functionality.

As a general matter, the relay node 103 may be fixed or wireless. Furthermore, a wireless relay node 103 may be implemented as a standalone mobile relay or a wireless terminal. Typically a mobile relay may be deployed in a movable vehicle such as a bus, train, ferry etc, primarily to serve UEs 107 in the movable vehicle, but also to serve UEs 107 in surrounding areas. relay nodes 103 may therefore be distinguished as being of different types.

However, despite the existence of different variants or types of relay nodes 103, the donor node 105 is unable to distinguish between these different types. Because of this, procedures specific to a particular relay type may not be executed, or are executed unnecessarily. As a consequence, some of the relay functions may not be operable, and the full potential of the relays 103 may not be utilized. Furthermore there will not be any motivation to deploy relays of different types, which are beneficial in different environments and scenarios.

Spectrum Usage in Relays

With respect to a relay nodes 103 usage of radio spectrum, an relay node 103 may be classified into the following two categories: in-band relay and out-band relay. For an in-band relay 103, the backhaul link 104 and the access link 108 operate using the same carrier frequency. Typically, therefore, communication over the backhaul 104 and access links 108 takes place in a time division manner. However, in principle, simultaneous operation over the two links may nonetheless be achieved with sufficient isolation between the access 198 and backhaul links 104, e.g. by virtue of directive transmission.

For an out-band relay, the backhaul link 104 and the access link 108 operate using different carrier frequencies.

Carrier Aggregation (CA) in Relays

Carrier aggregation is used to aggregate two or more component carriers for supporting high data rate transmissions over a wide bandwidth, e.g. up to a 100 Mega Hertz (MHz) for a single UE 107 in LTE. CA may be used in the downlink, uplink or in both direction. Carrier aggregation is also referred to as, e.g., interchangeably called, "a multi-carrier system", "multi-carrier operation", "multi-carrier" transmission and/or reception. Typically the component carriers in carrier aggregation belong to the same technology, e.g., all carriers are WCDMA carriers, or all carriers are LTE carriers. However carrier aggregation between carriers of different technologies is also possible to increase throughput.

CA may also be used in a relay environment to increase the data rate over the backhaul 104 and/or access link(s) 108. Furthermore, carrier aggregation may be used in both in band and out band relays. The same relay 103 may also be configured to operate in the baseline, i.e., legacy, single carrier operating mode.

Relay Deployment Scenarios

Typically more than one relay node 103 connects to the same donor base station 105. The relay nodes 103 are generally deployed in the coverage area of the donor cell, which is served by the donor node e.g. donor eNode B. As the primary function of the relay node 103 is to improve coverage, both outdoor and indoor relay node deployment scenarios are beneficial. An outdoor relay node 103 may be used for cell edge coverage improvement. An indoor relay node 10 3 may be used for solving indoor dead spot and hot spot scenarios.

Furthermore when deployed outdoor or indoor the antennas used for the backhaul 104 and access links 108 may either be in the indoor or outdoor i.e. any combination is possible in principle. Also, different Multiple-Input Multiple-Output (MIMO) configurations may also be used in the access 108 and backhaul links 104. For example, a relay node 103 may be associated with 2 transmit and 2 receive antennas on the access links 108, and 4 transmit and 4 receive antennas on the backhaul link 104 respectively.

In FIG. 2, the relay node 103 is deployed outdoors in a communications network 100. Further, all the relay antennas for the transmission/reception of signals over the backhaul link Un 104 to the eNB 105 and access link Uu 108 to the user equipment 107 are located outdoors. The outdoor relay 103 serves outdoor user equipments 107a, as well as indoor user equipments 107b.

In FIG. 3, the relay node 103 is deployed indoors in a communications network 100. Further, all the relay antennas for the transmission/reception of signals over the backhaul link Un 104 to the eNB 105 and the access link Uu 108 to the user equipment 107 are located indoors. The indoor relay node 103 primarily serves indoor user equipments 107.

In FIG. 4, the relay node 103 is deployed indoors in a communications network 100. But the relay antennas for the transmission/reception of signals over the backhaul link Un 104 to the eNB 105 are located outdoors, while the antennas for the access link Uu 108 to the user equipment 107 are located indoors. This type of relay deployment is also called a Thru-wall or through-wall deployment, and is meant to primarily serve indoor user equipments 107. The use of outdoor backhaul antennas results in improved backhaul link quality e.g. compared to the purely indoor deployment of FIG. 2.

Multi-Standard Radio (MSR) Relay

A relay node 103 may also comprise a Multi-Standard Radio (MSR). A MSR relay node 103 comprises common Radio Frequency (RF) components, e.g. power amplifiers, RF filters, which may be used to operate:

(1) more than one Radio Access Technology (RAT); or (2) more than one carrier within the same RAT.

More specifically, the MSR relay node 103 may also be termed as Multi-Carrier Multi-Standard Radio (MC-MSR) base station due to the fact that it may comprise a single RAT with more than one carrier.

Hence a single RAT MSR is a special case of an MSR. Furthermore a special case of MSR may also comprise a relay node 103 that supports a single carrier within a RAT, i.e. single carrier single RAT MSR relay 103. The MSR relay 103 may be Frequency-division duplexing (FDD) or Time-Division Duplex (TDD). Examples of RATs supported in FDD MSR relay are: LTE FDD, UTRA FDD and GSM/GERAN. Another example is: LTE FDD and 3GPP2 Code Division Multiple Access (CDMA) technologies, e.g. CDMA2000 and High Rate Packet Data (HRPD). Examples of RATs supported in FDD MSR relay are: LTE TDD and UTRA TDD.

The carriers within FDD or TDD MSR relay 103 may be contiguous or non-contiguous. Furthermore such relay 103 may be used in a single hop or in a multiple hop relay system.

Other Types of Relay Nodes

Relay nodes 103 may also be classified into other types of categories. The most fundamental classification of relays 103 is based on whether the relay 103 is fixed or movable:

Fixed relay: A fixed relay is always fixed in the sense that its geographical location remains unchanged.

Movable relay: A moveable relay may move or remain stationary depending upon the mobility state of the object carrying the relay. Hence mobility is the major characteristic of the movable relay, because its geographical location may change. However other characteristics may be very similar to those of the fixed relay. For instance similar to the fixed relay, the movable relay also has backhaul and access links, and may also be an in band or an out band.

A movable relay may further be classified into sub-categories. Non-limiting examples of the sub-categories of movable relays are Dedicated mobile relays: A dedicated mobile relay may be installed, for example, on a movable vehicle such as in a bus, train, boat etc to primarily serve the users inside the vehicle. However users outside the vehicle may also be served. This type of relay may be under the control of an operator or may be owned and managed by the subscriber or private owner.

Wireless terminals that act as a relay: Wireless terminals that act as a relay may be normal UEs or mobile terminals that are able to perform the relaying function.

Dedicated wireless terminal relays: Dedicated wireless terminal relays may comprise dedicated wireless terminal such as handheld wireless devices that perform relaying features to serve other users or terminals.

As stated in earlier there are different variants or types of relay nodes 103, and not all procedures specific to a particular relay type may be executed. Some of the relay functions may not be operable and the full potential of the relays 103 may not be utilized.

SUMMARY

An objective of embodiments herein is therefore to obviate at least one of the above disadvantages and to provide improved utilization of network resources in a communication network.

According to a first aspect, the objective is achieved by a method in a target node for handling capabilities of a wireless relay in a communication. The target node receives information indicating a capability of the wireless relay from the wireless relay. The information indicates whether the wireless relay is fixed or movable. Based on the received information, the target node determines a procedure to be executed, which procedure is dependent on whether the wireless relay is fixed or movable.

According to a second aspect, the objective is achieved by a method in a wireless relay for enabling a target node to handle capabilities of the wireless relay in a communications network. The wireless relay sends information indicating a capability of the wireless relay to the target node. The information comprises information whether the wireless relay is fixed or movable. The information enables the target node to handle capabilities of a wireless relay in the communications network.

According to a third aspect, the objective is achieved by a target node for handling capabilities of a wireless relay in a communications network. The target node comprises an attribute processing circuit configured to receive, from the wireless relay, information indicating a capability of the wireless relay from the wireless relay. The information comprises information whether the wireless relay is fixed or movable. The attribute processing circuit is further configured to, based on the received information, determine a procedure to be executed. The procedure is dependent on whether the wireless relay is fixed or movable.

According to a fourth aspect, the objective is achieved by wireless relay for enabling a target node to handle capabilities of the wireless relay in a communications network. The wireless relay comprises an attribute reporting circuit configured to send information indicating a capability of the wireless relay to the target node. The information comprises information whether the wireless relay is fixed or movable. The information enables the target node to handle capabilities of a wireless relay in the communications network.

Embodiments herein afford many advantages, of which a non-exhaustive list of examples follows:

The embodiments herein comprises advantageously operating a wireless communication network that uses one or more relay nodes based on attributes specific to those relay nodes. Network operation particularized for relay node attributes in this way may utilize network hardware resources more efficiently, better conserve radio resources, and facilitate more accurate network planning, as compared to known approaches that blindly operate without regard to relay node attributes.

Since the relay node signals its capability to the target node which enables the target node to explicitly and fully identify the relay characteristics, improved utilization of network resources in a communication network is achieved.

The embodiments herein are not limited by the above features and advantages. Those of ordinary skill in the art will appreciate additional features and advantages upon reading the following detailed description of example embodiments, and reviewing the figures comprised therein.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to a wireless communications network that uses one or more relay nodes, and to techniques for operating the wireless communication network based on attributes specific to those relay nodes.

Figure 5:
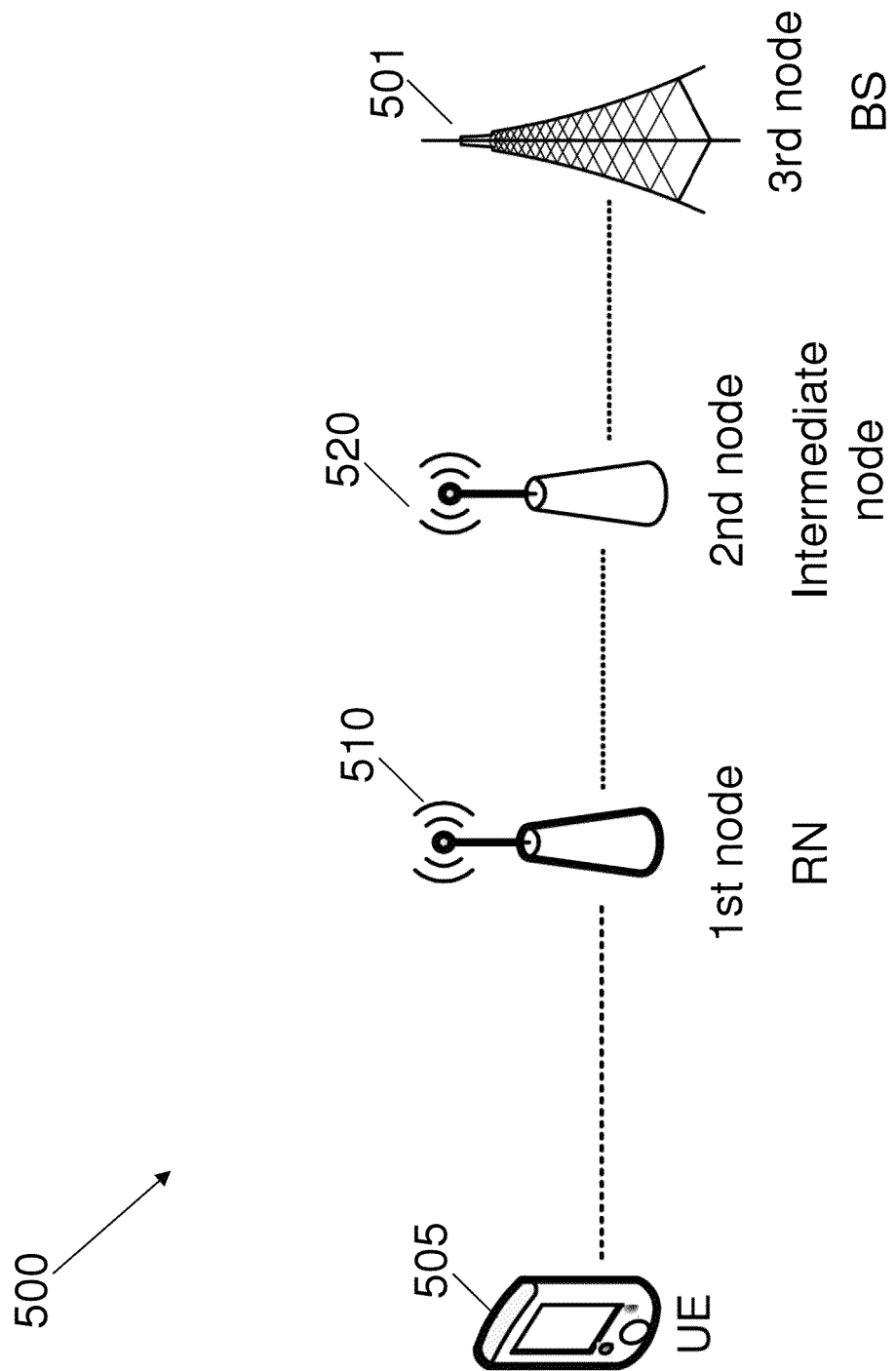
FIG. 5 is a block diagram illustrating embodiments of a communications network.

FIG. 5 depicts a communications network 500 in which embodiments herein may be implemented. The communications network 500 may in some embodiments apply to one or more radio access technologies such as for example LTE, LTE Advanced, Wideband WCDMA, UTRA TDD, GSM/GERAN, multi-standard radio (MSR), any other 3GPP radio access technology or even non-3GPP technologies like CDMA2000 1xRTT, CDMA2000 high rate packet data (HRPD) etc.

The communications network 500 comprises a third network node, referred to as a base station 501, serving a cell. The base station 501 may be a base station such as a NodeB, an eNodeB, access point, Base Transceiver Station (BTS) or any other network unit capable to communicate over a radio carrier with a user equipment 505 being present in the cell. The base station 501 may be referred to as a first network node 501. The user equipment 505 may be any suitable communication device or computational device with communication capabilities capable to communicate with a base station over a radio channel, for instance but not limited to mobile phone, smart phone, personal digital assistant (PDA), laptop, MP3 player or portable DVD player, or similar media content devices), digital camera, or even stationary devices such as a PC. A PC may also be connected via a mobile station as the end station of the broadcasted/multicasted media. The user equipment 505 may also be an embedded communication device in e.g. electronic photo frames, cardiac surveillance equipment, intrusion or other surveillance equipment, weather data monitoring systems, vehicle, car or transport communication equipment, etc. The user equipment 505 is referred to as UE in some of the figures.

A first network node, referred to as a relay node (RN) 510, is positioned between the base station 501 and the user equipment 505 so that transmissions between the base station 501, referred to as the donor base station, and the user equipment 505 are relayed by the relay node 510. The relay node 510 communicates wirelessly with the base station 501, and may therefore also be referred to as a wireless relay 510.

In some embodiments, a second network node 520 or intermediate node is located between the relay node 510 and the base station 501.

The first network node 510, the second network node 520 and the third network node 501 will be described in more detail below.

Figure 6:
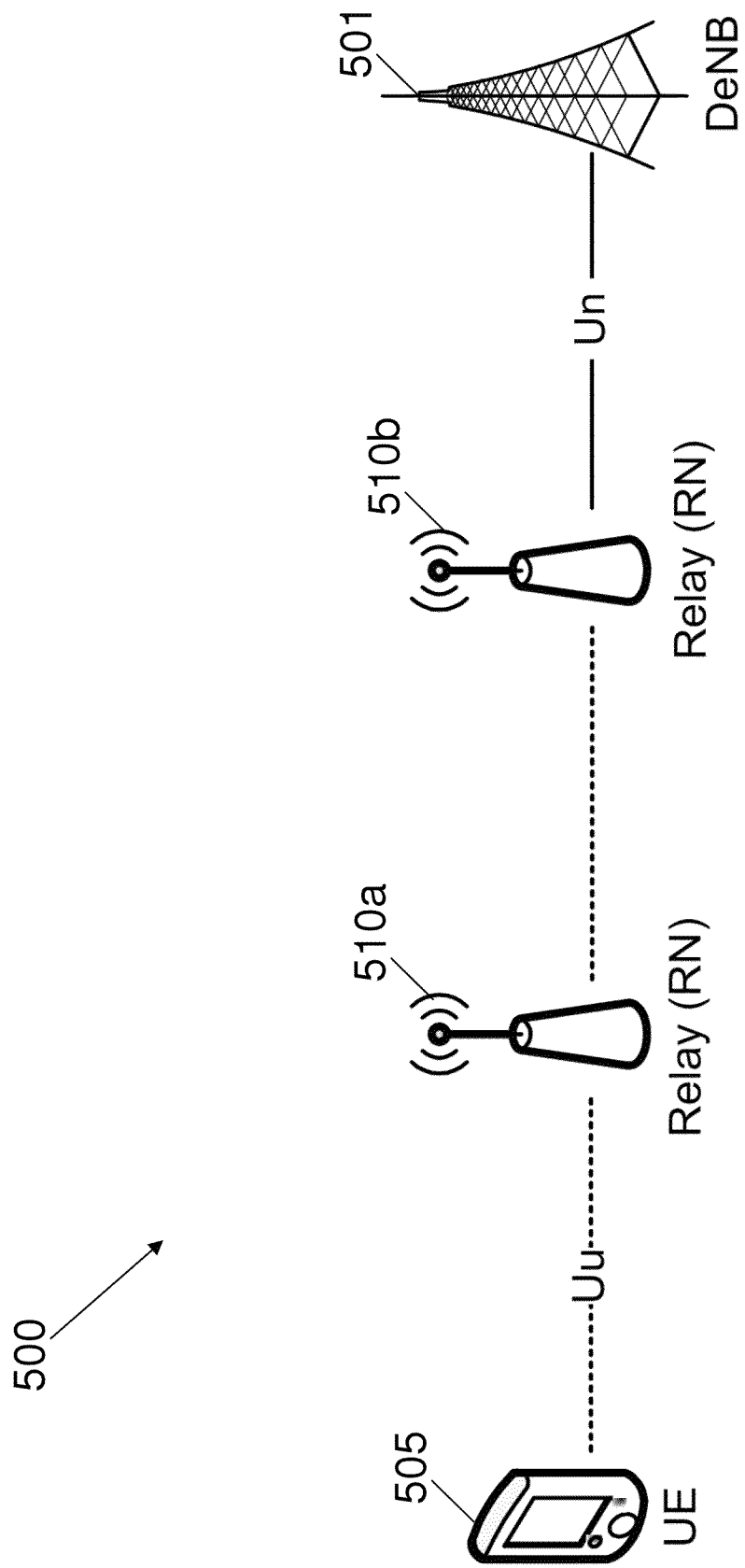
FIG. 6 is a block diagram illustrating a multi-hop relay overview.

Currently, LTE does not specify multi-hop relay architectures, where multiple relay nodes 510 are used between the served user equipment 505 and the base station 501. A multi-hop relay architecture based on 2 hops is illustrated in FIG. 6. In such architecture, the information "hops" from the base station 501, e.g. the donor eNB, in LTE through multiple relay nodes 510, for example through a first relay node 510a and through a second relay node 510b, until it reaches the user equipment 505. In a similar manner information sent from the user equipment 505 traverses multiple relay nodes 510a, 510b on the way to the base station 501, e.g. the donor eNB, in LTE.

Figure 7:
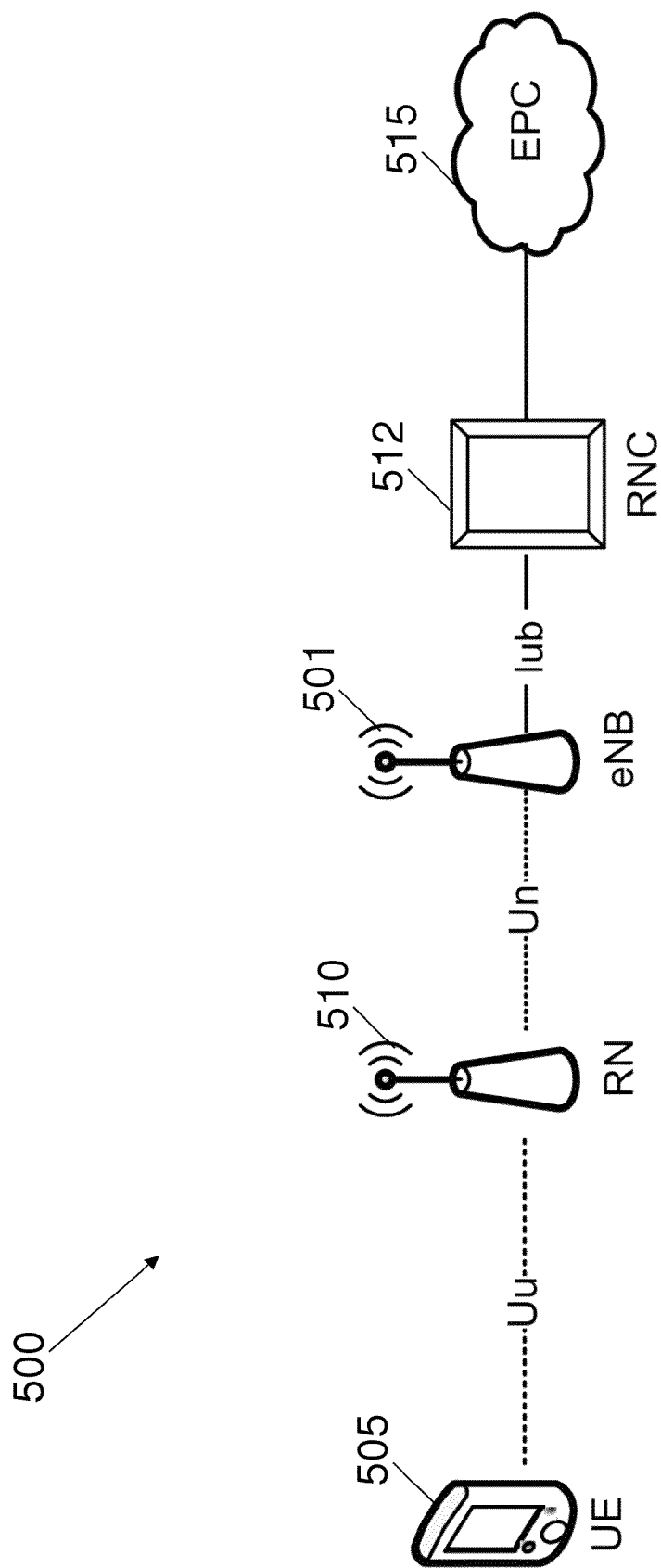
FIG. 7 is an overview of a possible relay architecture in HSPA.

Although discussed and illustrated above with respect to an LTE network, a multi-hop relay architecture may be employed in any network, including e.g. HSPA networks, i.e. UTRA FDD or TDD, GSM networks, i.e., EDGE, 3GPP2 CDMA technologies, e.g. CDMA2000 and HRPD, or multi-RAT carrier aggregation system such as HSPA-LTE CA etc. However the relay architecture may be slightly different in other technologies. In general a relay node 510 is connected via a backhaul link to any type of donor base station 501, e.g. belonging to HSPA, GSM, CDMA200, WiMax technology etc. A possible relay architecture in HSPA is shown in FIG. 7. For example in HSPA, the relay node 510 is connected to the base station 505, e.g. a Node B, which in turn is connected to a RNC 512 via an Iub interface. The RNC 512 is further connected to the EPC 515.

As stated in earlier there are different variants or types of relay nodes 510. The prior art solutions do not distinguish between different types of relays. Due to this limitation procedures specific to a particular relay type may not be executed. As a consequence some of the relay functions may not be operable and the full potential of the relay nodes 510 may not be utilized. Furthermore there will not be any motivation to deploy relay nodes 510 of different types, which are beneficial in different environments and scenarios.

The method for handling capabilities of a wireless relay in the communications network 500, according to some embodiments will now be described with reference to the combined signaling diagram and flowchart depicted in FIG. 8. The method comprises the following steps, which steps may as well be carried out in another suitable order than described below.

Step 801

The relay node 510 signals its relay type capabilities to the second network node 520, to the third network node 501 via the second network node 520 or directly to the third network node 501. The relay type capabilities may be in the form of a relay type indicator, where the indicator uniquely identifies a type or characteristic of the relay node 510.

The relay node 510 may be referred to as a first network node 510, however the term relay node 510 and the term wireless relay 510 may be used interchangeably in the following. The relay node 510 may be any type of relay node e.g. fixed relay, wireless terminal acting as relay, mobile relay etc. The relay node may belong to any RAT, e.g. LTE or HSPA, or it may comprise MSR. An MSR relay node may be with contiguous or non-contiguous spectrum.

As mentioned above, according embodiments herein, the first network node 510, e.g. the relay node 510, reports its capability to the second network node 520 or to the third network node 501, which uses the received capability information to uniquely identify the type, function and characteristic of the relay node. The relay node 510 may report its capability to more than one target node, e.g. a donor base station, a positioning node etc.

The type, function and characteristic of a relay node means in particular whether the relay node 510 is fixed or movable. It may also mean whether the relay node 510 is deployed in an indoor or outdoor location, or whether it is under control of the subscriber or under an operator. Another aspect of the function is whether a particular type of relay node 510 is presently using all its features or not e.g. wireless terminal acting as mobile or relay node or both.

The relay type capabilities may also indicate that the relay node 510 is a relay.

The advantage of uniquely identifying a particular type of relay node lies in the fact that actions, tasks or procedures specific to a particular relay node type may be carried out by the target node. The relay node type capability may also be exploited to perform network planning and management and thus improve overall network performance. All these aspects are described in greater detail below.

Step 802

In some embodiments, the relay node 510 sends its relay type capabilities to the second network node 520. Then, the second network node 520 receives the relay type capabilities from the relay node 510 and uses the relay type identifier to determine the task or procedure specific to the identified relay type, and performs or executes a task or a procedure specific to the type or characteristic of the relay node 510. The second network node 520 further uses the received capability information to uniquely identify the type, function and characteristic of the relay node 510.

The second network node 520 is a network node which directly may receive the relay type capability or relevant information from the relay node 510. Examples of second network node 520 are donor node, donor base station, donor Node B, donor eNode B, donor radio network controller, donor base station controller, another relay node in a multi-hop relaying system, positioning node, core network node, a base station, a network controller etc. The donor node such as DeNB in LTE which controls and manages the relay node is the most common example of the second network node 520.

In some embodiments, the second network node 520 forwards the received relay type capabilities to the third network node 501. In some embodiments, the second network node 520 may report the received relay type capabilities to other network nodes, e.g. a node in a core network, in addition to the third network node 501.

In some embodiments, the relay node 510 sends its relay type capabilities directly to the third network node 501. In other words, the third network node 501 may receives the relay type capabilities either directly from the relay node 510 or via the second network node 520.

The second network node 520 and/or the third network node 501 may uses the relay type identifier to determine the task or procedure specific to the identified relay type, and performs or executes a task or a procedure specific to the type or characteristic of the relay node 510. The second network node 520 and/or the third network node 501 further use the received capability information to uniquely identify the type, function and characteristic of the relay node 510.

The third network node 501 is the network node which communicates with the second network node 520. In some cases or for certain functions the relay node 510 may also communicate directly with the third network node 501. Examples of a third network node 501 are Operation and Maintenance (O&M), Operational Support Systems (OSS), Self Organizing Network (SON) node, base station, Node B, eNode B, core network node, e.g. MME or GW, another relay node, positioning node, e.g. Stand-Alone-Serving mobile location center (SAS) in HSPA and Evolved Serving Mobile Location Center (E-SMLC) in LTE or any type of network management controller or node.

Figure 8:
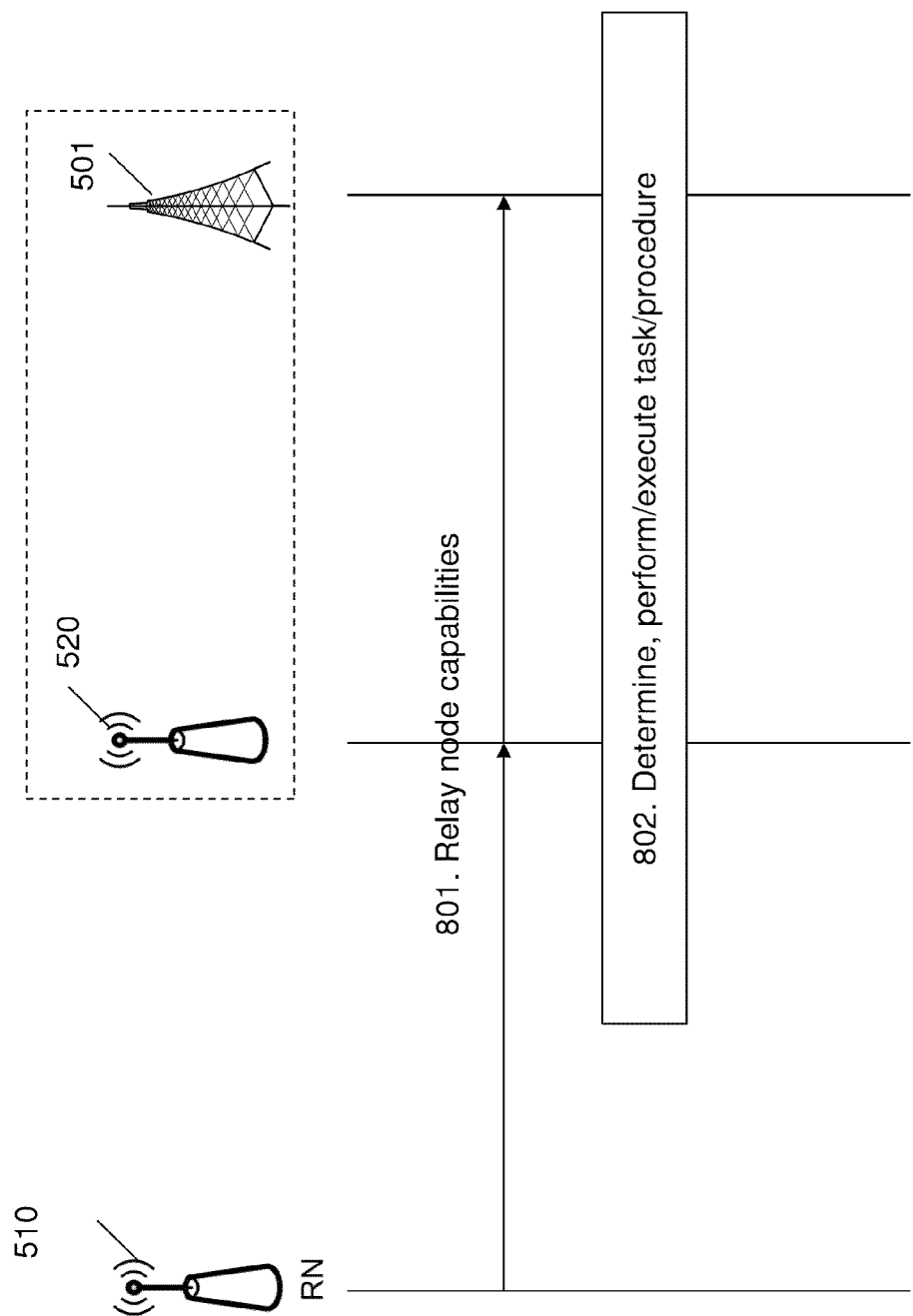
FIG. 8 is a combined signalling diagram and flow chart illustrating embodiments of a method.

In some embodiments, the second network node 520 and the third network node 501 is the same node, as illustrated by the dashed box in FIG. 8. In the following, the term target node 501, 520 will be used when referring to either the second network node 520, or the third network node 501 or to the case when the second network node 520 and the third network node 501 is the same node. The target node 501, 520 is the target which receives the information about the capability from the relay node 510.

Relay Node Types: In this section the meaning of the relay type will be explained with several examples.

In some embodiments there may be two relay node types: fixed and movable. Hence the relay type capability may be expressed by an indicator or any signaling means which distinguishes between the following two main categories: Fixed relay node and Movable relay node.

The signaling for the above capability reporting may require 1 bit of information to distinguish between the two relay node types. The relay node type indicator may also enable the receiving or target node 501, 520, e.g. donor base station, to distinguish between more varieties of relay nodes 510 such as:

Fixed relay node.
Dedicated mobile relay node.
Wireless terminal acting as a relay node.
Dedicated terminal solely for relaying.

The relay node type indicator may also enable the receiving or target node 501, 520, e.g. donor base station, to distinguish between even more varieties of relay nodes such as:

Fixed relay node.
Dedicated mobile relay node.
Wireless terminal type A acting as a relay node: partial mobile and relay operations.
Wireless terminal type B acting as a relay node: full mobile and relay operations.
Dedicated terminal solely for relaying.

Terminal Type A: In the above example the terminal Type A means that when the wireless terminal acts as relay node either the mobile operation or relay operation or both may only be performed partly. The meaning of the partial operation is explained below with few examples.

In some embodiments, the two tasks mobile and relaying functions may be performed in Time Division Multiplexed (TDM) manner or in Frequency Division Multiplex (FDM) fashion or combination of the two. The TDM approach means that for example the two tasks are performed alternatively; mobile communication and relaying are performed during time periods T1 and T2 over a cycle of a time period T0 where T0≥T1+T2. Similarly in case of terminal Type A which relies on the FDM, different parts of the bandwidth of the carrier or even different carriers are to be used for performing mobile and relaying functions at the same time.

Another variant of terminal Type A is that the wireless terminal may perform both mobile and relay node functions with full capabilities provided the load, e.g. bit rate, does not exceed a certain threshold.

Yet another aspect of partial operation or variant of terminal Type A is that some of the features or capabilities may not be used when the terminal acts as both mobile and relay node. Examples of features, which may not be used or fully used are positioning or certain type of positioning, e.g. Observed Time Difference of Arrival (OTDOA) may not be used when relaying, carrier aggregation or certain types of CA may not be performed or number of Component Carriers (CCs) in CA may have to be reduced etc. The CA is interchangeably called as multi-carrier or multi-cell system.

In summary, there may be different sub-variants of Type A relay node. The receiving node/target node 501, 520 may distinguish between these different sub-variants using an indictor or additional indicator or any suitable information or additional information received from the relay node 510.

Terminal Type B: The terminal Type B in the above example means that the wireless terminal is capable of operating as a relay node without hampering the normal mobile communication operation. As compared with Relay Type A, the Relay Type B bears typically more processing capability and power.

Dynamic Characteristics of Relay Nodes: The movable relay node 510 may also temporarily become stationary. For example the dedicated mobile relay node installed in a boat or a ferry may become stationary when the boat or the ferry is anchored on a port. This temporary change in the mobile state of the movable relay node may also be communicated to the target node 501, 520. According to the first alternative the relay node 510 and in particular when being movable, may report an additional indicator or information to the target node 501, 520 indicating whether the relay node 510 is currently stationary or movable. This will enable the target node 501, 520 to decide whether to execute the tasks which are specific to the mobility or not. The following rules may also be pre-defined:

The relay node 510 being movable, e.g. a mobile relay node or a wireless terminal acting as relay node, is considered movable by default.
If the movable relay node 510 is stationary or if its speed is below threshold over certain time window (Ts) then the relay node 510 informs the network, i.e. target node 501, 520, that presently it is stationary or in a state of rest.

According to some embodiments, the receiving node, e.g. donor base station, i.e. target node 501, 520, itself measures the speed of the relay node 510 to determine whether the movable relay node is currently stationary or moving. Accordingly the receiving node, i.e. target node 501, 520, may perform the relevant task depending upon the mobility state of the movable relay node.

Operational or Functional Modes of Relay Nodes

Certain types of wireless terminal acting as relay node 510 may or not act as mobile and relay node all the time. For example the Type A relay node described above may perform all tasks related to mobile operations with full capability when not acting as relay node. Hence such a relay node 510 may send a specific indicator to the relevant node, e.g. to donor node or positioning node, i.e. target node 501, 520, to inform that it is carrying out specific function or not carrying out some other functions. For example when acting as mobile only, the wireless terminal may meet all the supported positioning requirements. Hence the positioning node, i.e. the target node 501, 520, may request the wireless terminal, e.g. Type A, when operating only as mobile to perform all necessary positioning measurements e.g. Reference Signal Time Difference (RSTD) measurements in LTE OTDOA positioning.

As stated earlier, in LTE the relay node 510 sends an indicator, i.e. RN indicator, to indicate that the reporting node is a relay node. Hence the 'relay type capability information' to identify the type or characteristic or other features of the relay node 510 may be sent in addition to the existing signaling, i.e. RN indicator, to indicate that the reporting node is the relay node 510.

Relay Type Capability Reporting Mechanisms: The reported relay type capability may be one of the pre-determined relay types, which were described above. If the relay types are pre-determined then the relay node 510 may signal an identifier corresponding to its relay type capability. In this way the signaling overheads are reduced. The relay node 510 may also report more than one capability or corresponding identifiers in case the same relay node 510 is capable of having multiple relay type characteristics. It is up to the network i.e. donor node, target node 501, 520, or other relevant node, to decide as to which feature or characteristic of the relay node 510 is to be used.

The relay node 510 uses appropriate protocol or signaling means to report its relay type capability to the target node 501, 520. Examples of protocols which may be used for such reporting are: RRC, Low-Power Probing (LPP), Media Access Control (MAC) etc. For example RRC protocol is used over Un interface, e.g. RN-DeNB interface in LTE, to report such capability to the target node 501, 520, i.e. donor node such as DeNB in LTE. The LPP protocol may be used for reporting the relay type capability if the target node 501, 520 the positioning node which is E-SMLC in LTE.

The relay node 510 may report the relay type indicator or related information under the following circumstances or conditions, but not limited to proactive relay type capability reporting and relay type capability reporting based on explicit request.

Proactive Relay Type Capability Reporting: According to some embodiments the first node, i.e. relay node 510 may signal the relay type capability information, i.e. an indicator or any relevant information, to the target node 501, 520, proactively without receiving any explicit request from the target node 501, 520.

The relay node 510 may signal the relay type capability information to target node 501, 520 proactively during for example any of the scenarios below:

During an RRC connection setup phase when the relay node 510 is connected to the donor node, e.g. donor eNB in LTE, or during any phase when the relay node 510 is initially setup or introduced or connected to the existing or new donor node.

After the recovery of the connection loss due to any reason. For example after the RRC connection re-establishment which occurs upon recovering from radio link failure, handover failure etc.

When the relay node 510, in particular when being a movable relay node, performs handover to new donor node. The relay node 510 may report the relay type capability to the new donor node, i.e. the target node 501, 520, before, during or just after the handover.

When the relay node 510, in particular when being a movable relay node, detects that its mobility state is changed e.g. from non-zero speed to stationary state or vice versa. In this case the relay node 510 may report the current state of its mobility. The reporting may be done based on pre-determined rules e.g. a time period over which the speed is to be measured. Any state of the art method of measuring speed may be used; but the method to use may be pre-defined.

When the relay node 510 is modified e.g. one or more parameters associated with the relay node 510 are changed, the relay node 510 is upgraded or downgraded When the relay node 510 notices that new network nodes such as a relay node, an RNC or a positioning node, are introduced or removed in the network 500. The first node, i.e. relay node 510, may notice this change in case it receives new or previously unknown cell identifier(s) from the other nodes or it measures/receives signals from previously unknown second network nodes 520 and/or third network nodes 501.

When the cell identifier or any relevant identifier of any of the existing target node 501, 520, e.g. cell ID of donor base station, is changed. The cell identifier or any other identifier of the base station or any other node may be changed due to the network planning or when new nodes are added or the existing ones are removed.

The proactive reporting may also be limited to the pre-determined target or receiving node e.g. donor node such as a DeNB in LTE or a DNB/RNC in HSPA. The pre-determined receiving node, i.e. the target node 501, 520, may forward the received relay type capability to other nodes.

Relay Type Capability Reporting Based on Explicit Request: According to this mechanism of the relay type capability reporting, the relay node 510 may report its relay type capability to the target node 501, 520 upon receiving an explicit request message from the requested n target node 501, 520. The target node 501, 520 receiving the relay type capability information may be one or more second network nodes 502 and/or third network nodes 501. The relay node 510 may report its capability to the node which sends the request. However in some cases one of the target node 501, 520 may request the relay node to report its capability to several target node 501, 520 by specifying the recipient nodes. For example the target node 501, 520, i.e. donor eNB in LTE, may request the relay node to report its relay type capability to the requesting node, e.g. donor eNB, and also to the positioning node. Hence the requesting and the target node 501, 520 may be the same or may also be different.

There are several alternatives as explained below:

According to one alternative the requesting node specifies the target node(s) 501, 520, e.g. node Identity (ID) or pre-defined tag, in the relay type capability request message sent to the relay node 510. There may be more than one receiving target node 501, 520 as described earlier. Upon receiving such a message the relay node 510 reports the relay type capability information to all the specified target nodes 501, 520.

According to some embodiments, the target node(s) 501, 520, i.e. the node receiving relay type capabilities, may be pre-defined node(s). Upon receiving the request message from the target node 501, 520, the relay node 510 may report its capability to all the pre-defined target nodes 501, 520. In some embodiments, the target node 501, 520 may be pre-defined as the same node which requests the relay node to report its relay type capabilities. In another example a specific second node 520, e.g. donor eNB, may be pre-defined as the target node 501, 520 regardless which node requests the relay node 510 to report its relay type capability. Yet in another embodiment multiple second nodes may be pre-defined as the target nodes. Yet in another example different types of relay capabilities may be reported to different target nodes 501, 520. For example a capability whether the terminal may act as a relay node 510 or not is reported to the target node 501, 520. But the capability whether the terminal acting as relay node may also perform positioning or not is reported to only the positioning node and also to the core network node.

The embodiments described in the preceding section enabled the target node 501, 520, e.g. donor node, DeNB in LTE etc, to acquire the relay type capability from the relay node 510.

According to some embodiments, the acquired relay type capability or the relevant information is signaled or forwarded by the acquired node, i.e. the target node 501, 520, to other network nodes.

The acquired relay type capability information may be forwarded to the other network node transparently or non-transparently. In the former case the target node 501, 520 forwards the information to the other network node without modifying the contents of the message received from the first node, i.e. the relay node 510. In the latter case the target node 501, 520 may decode the message received from the relay node 510 and may even modify the contents of the received message before sending it to the other network node. In some embodiments, the target node 501, 520 is the second network node 520 and the other node is the third network node 501. In some embodiments, the target node 501, 520 is the third network node, and the other node is another node in the network 500.

Consider that the donor node, e.g. DeNB in LTE, which is the target node 501, 520 receives the relay type capability information from the relay node 510, which is a movable relay node. Furthermore the movable relay node 510 is the dedicated mobile relay node. According to some embodiments, the donor node signals this information to the core network node, e.g. MME or GateWay (GW), which may therefore be considered as the third network node 501. Yet in another example the donor node may signal or forward the received capability information to a neighboring base station. For example the DeNB signals/forwards the received relay type capability information to one or more neighboring base stations, e.g. eNBs. The neighboring base stations may be closest neighboring base stations on those which are strongest for the relay node 510. Hence one of such neighboring eNBs may potentially become new DeNB for the relay node whose capability information is provided by the current DeNB.

Examples of Interfaces and Protocols for Forwarding Capability to Third Node

A suitable protocol may be used between the second network node 520 and the third network nodes 501 for signaling the relay type capability information. The protocol and the interface to be used depend upon the type of second network node 520 and the third node 501 as explained by the following examples:

Assume that the second network node 520 and third network node 501 are a donor eNB and a positioning node such as E-SMLC in LTE respectively. Hence the DeNB may send the received relay type capability to the E-SMLC over the eNB-E-SMLC interface using LPPa protocol.

Consider that the second network node 520 and the third network node 501 are donor Node B and RNC in HSPA respectively. Hence the DNB may send the received relay type capability to the RNC over the Node B—RNC interface using Iub protocol.

Consider another scenario where the third network node 501 is a neighboring eNB in LTE. In this case the DeNB may signal the received capability information to neighboring eNBs over the X2 interface.

Consider another embodiment in which the third network node 501 is the core network node such as MME or GW. Hence the DeNB may signal the received capability information to the core network nodes such as MME or gateway over S1 interface.

Consider that the second network node 520 and the third network node 501 are positioning node such as E-SMLC in LTE and core network node such as MME respectively. In this case the positioning node may send the received relay type capability to the MME or GW over the SLs interface.

Yet in another example the third node 501 may be OSS, O&M or SON node, which typically perform network planning, optimization, configuration etc. In this case the donor node, e.g. DeNB or DNB etc., may signal the received capability information to these nodes.

Examples of Scenarios for Forwarding Capability to Third Node

The second network node 520 may send or forward the received relay type capability or relevant information to the target node 501, 520, e.g. the third network node 501, under one or more of the following scenarios but not limited to:

Sent by the second network node 520 to the target third network node 501 upon explicit request from the target third network node 501.

Sent by the second network node 520 to the target third network node 501 when any new relay node 510 is incorporated or whenever the updated relay type capability information is received from the existing relay node 510. This may occur during initial set up of the relay node 510 such as during RRC connection establishment phase or during the RRC re-establishment or during or after handover in case of movable relay node etc.

Sent by the second network node 520 to other potential target third network nodes 501 proactively, e.g. periodically or at any time or when specific event occurs.

Sent by the second network node 520 to other potential target third network nodes 501 whenever any of the relay type capability is modified e.g. movable relay node 510 becomes stationary Using Relay Type Capability Information for Specific Purposes: The relay type capability reporting enables the receiving node, i.e. the target node 501, 520, to explicitly and fully identify the relay characteristics. This has two main benefits. First, the network may execute the procedures which are relevant to the characteristics of the relay node 510 or the network 500 may provide necessary information, e.g. parameter values, to assist the relay to perform specific tasks. Second, the network 500 may use this capability information for performing certain network planning and management These two aspects are described with examples in the next sections.

Use of Relay Node Type Capability Information for Relay Node Type Specific Procedures Some of the procedures are common for all or most types of relay nodes 510. On the other hand certain procedures are specific to a particular relay type. The procedures may also depend upon the current state or operational mode of a particular type of relay node 510. For example certain tasks are used for a movable relay node. However when such relay node 510 is stationary then the network 500, i.e. target node 501, 520, may not execute such procedures. Another scenario is when a certain relay node 510 is not using all possible operational modes e.g. a wireless terminal acting as relay node is not performing relaying function. In such cases certain channel quality measurements which are specific to backhaul link are not needed. Hence the network 500, i.e. target node 501, 520, will not request the relay node to perform additional measurements which reduces the relay node complexity and processing.

Examples of procedures which depend upon the type of relay nodes are described in the following.

Measurements for Initial Selection of Donor Node: A movable relay node 510 and in particular a wireless terminal acting as relay node 510 may have to perform signal strength or quality measurements over downlink signals from multiple potential donor nodes, e.g. DeNBs, to initially select the strongest donor node. The network 500, i.e. target node 501, 520, may have to signal necessary parameters, e.g. IDs of potential donor nodes, to assist the relay node 510 to do such measurements. Such information may be broadcasted by the network 500 if the network 500 discovers that there are movable relay nodes 510 operating in the network 500. The network 500, i.e. target node 501, 520, may also request the relay node 510 to do such measurements at the time of initial setup before finally selecting the donor node. Examples of signal strength and/or signal quality measurements are RSRP and RSRQ in LTE and CPICH RSCP and CPICH Ec/No in HSPA.

Allocation of Backhaul Resources Based on Signal Quality: In case the relay node 510 being movable, and in particular under moderate or higher speed, the resources allocated by the network 500, e.g. donor eNB, for the backhaul communication may be selected based on the backhaul link quality. The link quality changes over time and in frequency with the variation of the radio characteristics and environment. To ensure the efficient use of radio resources the donor node, i.e. the target node 501, 520, requests the movable relay node 510 to measure and report the Channel State Information (CSI). Examples of CSI measures comprise: Channel Quality Indicator (CQI), Rank Indicator (RI) or Pre-coding Matrix Indicator (PMI). Due to changing radio environments, such reports may be required frequently e.g. once every Transmission Time Interval (TTI) or few times every frame, e.g. 10 ms. The CSI reporting rate required for dedicated mobile relay nodes and wireless terminal acting as relay nodes may also be different; the latter requiring more frequent CSI reports. Similarly the type of CSI measurements may also depend upon the type of relay node 510 e.g. wireless terminal may be required to report only CQI since it may not typically support multiple antennas on the backhaul due to complexity. The donor node then assign resources, e.g. resource blocks, whose CSI is above threshold. The CSI reporting involves signaling overheads and processing in relay node 510 and donor node, e.g. the target node 501, 520. In case of a fixed relay node, the radio environment is static or changes very slowly due to moving objects between donor node, e.g. the target node 501, 520, and the relay node 510. This means the CSI reports are not necessary in case of a fixed relay node. Therefore typically the fixed relay node 510 may not be requested by the donor node, e.g. target node 501, 520, to send the CSI reports. If necessary it may be requested to send reports with much lower rate, e.g. once every second. This means the CSI procedures are highly dependent upon the type of relay node 510.

Mobility Procedures: A movable relay operation would typically require the mobility procedures. Such procedures are similar to those used for the normal user equipment 505. For example the relay context may have to be transferred to the target donor node, e.g. the target node 501, 520. The resources at the target donor node, e.g. the target node 501, 520, may have to be reserved by the involvement of the donor node, e.g. the second network node 520, and core network, e.g. the third network node 501, before the handover is done to the new target donor node, e.g. the target node 501, 520. In case of a fixed relay node, similar mobility procedures may be used but they are not executed so frequently. Furthermore some of the procedures such as measurement configurations are not needed for the fixed relay node 510. If the movable relay node 510 becomes stationary over a certain time period then the network 500, i.e. the target node 501, 520, may decide not to execute the mobility procedure or perform them very rarely or with very low rate.

Measurement Configurations for Handover to New Donor Node: In order to perform handover, the movable relay node 510 and in particular wireless terminal acting as relay node 510 may be configured to perform measurements on the neighboring base stations, e.g. neighboring eNBs, which may become new donor node. The measurement configuration procedure requires the serving donor node, e.g. DeNB, to configure the specific measurements, e.g. RSRP, RSRQ or both, types of measurement events, associated threshold for reporting configured measurement event(s), time averaging parameters, e.g. time to trigger, layer-3 filtering coefficient, measurement bandwidth in case of LTE etc. Typically handover does not occur in case of fixed relay nodes 510. The measurement procedures comprise signaling overheads, processing and complexity in the user equipment 505 and also in the network 500. Therefore such procedures may be used only when necessary e.g. in case of a movable relay node 510. This means that in the case of fixed relay nodes 510 the network 500, i.e. the target node 501, 520, will not typically use the measurement configuration procedures or may be used very selectively and rarely.

Radio Link Monitoring Procedures: The radio link monitoring procedures are used to ensure that the relay node 510 is able to maintain the serving link quality, i.e. over relay-donor node link. This guarantees that the link quality, e.g. for signaling and data transmissions, between the relay node 510 and the donor node, i.e. the target node 501, 520, is within acceptable limit. The radio link monitoring procedures are required for all types of relay nodes since link quality may be maintained. However some of the parameters and details of procedures are specific to the type and characteristics of the relay nodes 510. For example the averaging duration over which the relay node 510 may monitor the serving node radio link quality, e.g. out of sync, in sync detection evaluation periods, configurable in sync and out of sync hysteresis counters, configurable radio link failure timer etc., depends upon the type of relay node 510. For fixed relay nodes the monitoring of the radio link quality may be performed over much longer time e.g. several seconds. However for the movable relay node 510 the monitoring of the radio link quality may be performed over much shorter time e.g. 100-200 ms. Similarly for the fixed relay node 510 the radio link monitoring timer, e.g. T310 used in LTE, over which the relay node 510 may monitor the radio link quality before declaring the radio link failure may be relatively very long e.g. 10-30 seconds. However, for the movable relay node 510 the radio link monitor timer may be much shorter e.g. 1-5 seconds. These timers or other parameters such as counters, N310, N311 used in LTE etc., are configured by the donor node e.g. by the DeNB in case of LTE relay nodes. Hence only by knowing the type of the relay node, the network 500, i.e. the target node 501, 520, may choose the most appropriate settings of the parameters associated with the radio link monitoring parameters. If the same parameters are used regardless of the specificity of the relay node 510, the performance of different types of the relay nodes 510 will not be adequate and optimum. The parameters may also be adjusted for the same type of relay depending upon the current mobility state or operational mode of the relay node 510.

Additional Emission Requirements: A movable relay node 510 and in particular a wireless terminal acting as relay node 510 may be required to meet regional specific radio emission requirements such as spurious emission level or any type of out of band emission requirements. Such requirements are set by the regulatory bodies. To ensure that the relay node 510 is compliant to such requirements, specific parameters may be signaled by the donor node, e.g. the target node 501, 520, to the relay node 510 depending upon the type of relay node. Examples of such signaled and/or configurable parameters are maximum output power back-off, Additional-Maximum Power Reduction (A-MPR) etc. If the relay node 510 is fixed and used in a region where such requirements are to be met, then the relay node 510 may already be designed to be compliant to such requirements. Hence the network 500, e.g. the target node 501, 520, DeNB, does not need to signal such parameter to the fixed relay node 510. On the other hand the movable relay node 510 may roam and thus may move from one region to another. Therefore specific procedure indicating the relay node 510 to adjust, i.e. reduce or increase, its maximum output power in order to meet the additional emission requirements may be executed by the donor node only for the movable relay node.

Use of Relay Node Type Capability Information for Network Management and Planning The relay type capability information may also be used by various network nodes, e.g. the target node 501, 520, for different purposes such as for the network/cell planning or dimensioning etc. The capability information may be provided by the target node 501, 520, e.g. donor base station, to the appropriate node, e.g. the third network node 501, or use itself for network enhancement as elaborated below.

Different types of relay nodes 510 may lead to different performance. For example the fixed relay node 510 may provide better coverage in a cell but may not be able to provide very higher data rate to users in the cell border. However the dedicated mobile relay node 510 being very close to the user equipments 505 may enable very high data rate. But the backhaul link of the dedicated mobile relay node 510 may require higher transmission power level to maintain better link quality.

Thus, the second network node 520 such as donor base station, e.g. donor eNB in LTE, or the third network node, e.g. SON, O&M, OSS etc., may use the relay type capability for determining the cell capacity, peak user bit rate, potential number of users etc. The donor base station or the third network node 501 may further use this information to determine the number of relay nodes 510 required to serve certain amount of traffic and/or user equipments 505 in the coverage area. The required number of nodes would depend upon the number and proportion of different types of relay nodes 510 available in a coverage area. The network 500, e.g. the target node 501, 520, may also identify the required number of donor nodes and their capacity to ensure that different types of relay nodes 510 in the network 500 are optimally utilized. The network 500, e.g. the target node 501, 520, may also identify the required hardware resources in the network 500 to utilize different types of relay nodes 510. Examples of hardware resources are capacity of the fixed interfaces, e.g. X2, S1, LPPa, SLs etc in LTE, between the network nodes, e.g. the target node 501, 520, memory and buffer size, processors used to process and execute procedures etc. For example if there are substantial number of movable relay nodes 510 then the network 500, e.g. X2, S1, LPPa, SLs etc in LTE, may require additional hardware resources to execute specific procedures such as handovers, measurement procedures, radio emission control etc. In other words the statistics may be used to dimension the network 500 as described below, e.g. number of relay nodes 510 and number of donor nodes, e.g. target nodes 501, 520, required in the network 500.

Depending upon the types of relay nodes 510 and their characteristics, the donor base station, the target node 501, 520 may use other means to enhance capacity or data rate e.g. by using antenna with high gain etc.

Another example is that of the positioning, which may determine whether the emergency call requirements in terms of delay are met by the wireless terminals when they also act as relay nodes 510. The positioning node, e.g. the target node 501, 520, may adjust certain parameters such as reduce the number of cells to measure when sending the assistance data to the wireless terminal while it is also acting as a relay node 510.

In particular the third network node 501 such as SON and/or O&M nodes may further use the relay type capability information in dimensioning the required number of the overall network nodes or coverage. For example they may identify a suitable number of relay nodes 510 and other network nodes and their capacity required in the given environment in the entire or part of the network 500.

In order to ensure optimum relay operation, the network 500 may be capable of executing the specific procedures associated with the type of relay node 510. For example mobile relay operation requires specific measurement procedures. By the virtue of embodiments herein the network 500 e.g. the target node 501, 520, DeNB, MME etc may in fact perform tasks, which are specific to the relay characteristic. For example the donor base station, e.g. the target node 501, 520, may request the mobile relay node 510 to perform and report signal strength measurements from multiple base stations before selecting another donor base station, e.g. another target node 501, 520.

The relay type capability information may also be used by the donor node, e.g. the target node 501, 520, for selecting the most appropriate relay node 510 for a particular purpose e.g. mobile relay node 510 for high data rate services, wireless terminal acting as a relay node 510 for short range and/or low bit rate services etc. In this way load on different types of relay nodes 510 may be balanced.

The relay type capability information may further be used by the target node 501, 520 for network planning/dimensioning, coverage enhancement, improving network performance etc.

Figure 9:
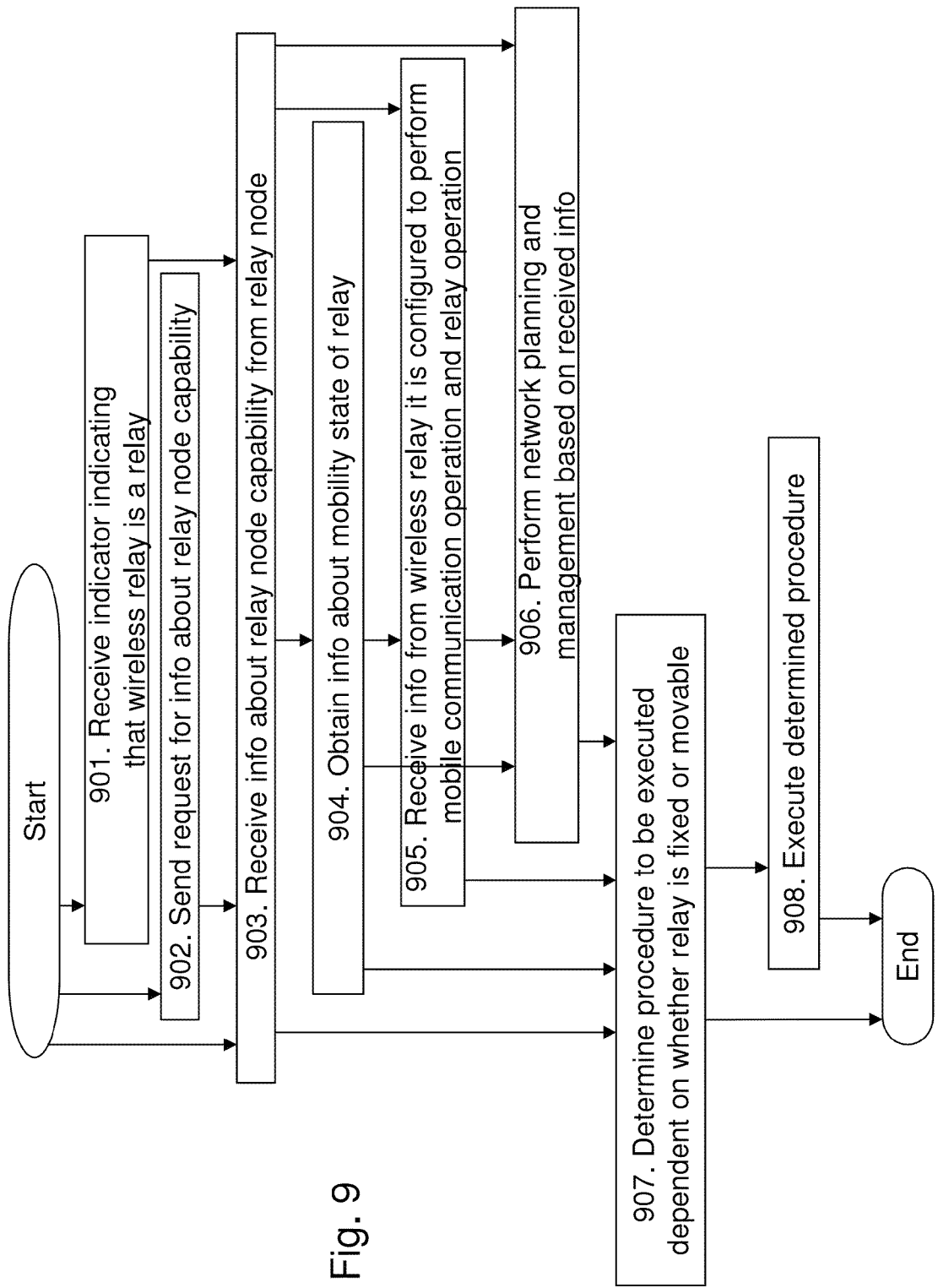
FIG. 9 is a flow chart illustrating embodiments of a method in a target node.

The method described above will now be described seen from the perspective of the target node 501, 520. FIG. 9 is a flowchart describing the present method in the target node 501, 520 for handling capabilities of the wireless relay node 510 in the communications network 500. As mentioned above, the target node 501, 520 is a donor node, a donor base station, a donor NodeB, a donor evolved NodeB, a donor radio network controller, a donor base station controller, a second wireless relay node, a positioning node, a core network node, a base station, a network controller, a self organizing network, referred to as SON, an operation and maintenance node, referred to as O&M, an operational support system node, referred to as OSS, a NodeB or an evolved NodeB.

The method comprises the following steps to be performed by the target node 501, 520, which steps may be performed in any suitable order:

Step 901

This step corresponds to step 801 in FIG. 8.

In some embodiments, the target node 501, 520 receives, from the wireless relay 510, an indicator indicating that the wireless relay 510 is a relay.

Step 902

In some embodiments, the target node 501, 520 sends, to the wireless relay 510, a request for information of the capability of the wireless relay 510.

In some embodiments, the sent request indicates to which receipt nodes in the communications network 500 the reply to the request is to be sent.

Step 903

This step corresponds to step 801 in FIG. 8.

The target node 501, 520 receives, from the wireless relay 510, information indicating a capability of the wireless relay 510. The information indicates whether the wireless relay 510 is fixed or movable.

In some embodiments, the information is received as multiple set of information.

In some embodiments, the information is received from the wireless relay 510 via a network node 520, which network node 520 is a donor node, a donor base station, a donor NodeB, a donor evolved NodeB, a second wireless relay node, a NodeB or an evolved NodeB. In the above description, the network node 520 is described as the second network node 520.

In some embodiments, the information further comprises information whether the wireless relay 510 is a dedicated movable wireless relay, a wireless terminal acting as a movable wireless relay, a wireless terminal dedicated for relay, a wireless terminal acting as a relay with partial mobile and relay operations or a wireless terminal acing as a relay with full mobile or a relay operations.

In some embodiments, the information is received according to a Radio Resource Control protocol, referred to as RRC, a Long Term Evolution Positioning Protocol, referred to as LPP, or according to a Media Access Control protocol, referred to as MAC, protocol.

Step 904

This step corresponds to step 802 in FIG. 8.

In some embodiments, the target node 501, 520 obtains information about a mobility state of the wireless relay 510.

Step 905

This step corresponds to step 802 in FIG. 8.

In some embodiments, the target node 501, 520 receives information from the wireless relay 510 that the wireless relay 510 is configured to perform at least one of mobile communication operation and relay operation.

Step 906

This step corresponds to step 802 in FIG. 8.

In some embodiments, the target node 501, 520 performs network planning and management based on the received information.

Step 906*a*

This is a substep of step 906. This step corresponds to step 802 in FIG. 8.

In some embodiments, the target node 501, 520 sets a maximum output power of the wireless relay 510.

Step 906*b*

This is a substep of step 906, and a step to be performed after step 906*a* or instead of step 906*a*. This step corresponds to step 802 in FIG. 8.

In some embodiments, the target node 501, 520 determines a number of target nodes 501, 520 to serve the wireless relay 510.

Step 906*c*

This is a substep of step 906, and a step to be performed after step 906*a*, after step 906*b* or instead of step 906*a*-906*b*.

In some embodiments, the target node 501, 520 determines a hardware resource of the target node 501, 520.

Step 906*d*

This is a substep of step 906, and a step to be performed after step 906*a*, after step 906*b*, after step 906*c*, or instead of step 906*a*-906*c*. This step corresponds to step 802 in FIG. 8.

In some embodiments, the target node 501, 520 determines a radio resource in the target node 501, 520.

Step 907

Based on the received information, the target node 501, 520 determines a procedure to be executed. The procedure is dependent on whether the wireless relay 510 is fixed or movable. This step corresponds to step 802 in FIG. 8.

In some embodiments, the target node 501, 520 determines the procedure to be executed further based on the obtained information about mobility state.

In some embodiments, the target node 501, 520 determines the procedure to be executed further based on the information about the wireless relay 510 being configured to perform at least one of mobile communication operation and relay operation.

Step 908

This step corresponds to step 802 in FIG. 8.

In some embodiments, the target node 501, 520 executes the determined procedure dependent on whether the wireless relay 510 is fixed or movable.

Step 908*a*

This is a substep of step 908. This step corresponds to step 802 in FIG. 8.

In some embodiments, the wireless relay 510 is movable.

In some embodiments, the target node 501, 520 sends, to the wireless relay 510, configuration information associated with an initial selection of the target node 501, 520 or a handover. The configuration information enables the wireless relay 510 to perform a measurement associated with the initial selection of the target node 501, 520 or the handover.

Step 908*b*

This is a substep of step 908, and is a step performed after step 908*a* or instead of step 908*a*. This step corresponds to step 802 in FIG. 8.

In some embodiments, when the wireless relay 510 is movable, the target node 501, 520 sends a request to the wireless relay 510 to measure and report a channel state information, referred to as CSI.

Step 908*c*

This is a substep of step 908, and a step to be performed after step 908*a*, after step 908*b*, instead of step 908*a*, instead of step 908*b* or instead of both steps 908*a* and 908*b*. This step corresponds to step 802 in FIG. 8.

In some embodiments, the wireless relay 510 is movable.

In some embodiments, the target node 501, 520 sends information about an adjustment of output power to the wireless relay 510.

Step 908*d*

This is a substep of step 908, and a step to be performed after step 908*a*, after step 908*b*, after step 908*c*, instead of step 908*a*, instead of step 908*b*, instead of step 908*c*, instead of steps 908*a*-908*c*. This step corresponds to step 802 in FIG. 8.

In some embodiments, the target node 501, 520 sends a request to the wireless relay 510 to monitor a radio link between the first network node 105 and the wireless relay 510.

Step 908*e*

This is a substep of step 908, and a step to be performed after step 908*d*. This step corresponds to step 802 in FIG. 8.

In some embodiments, the target node 501, 520 sends, to the wireless relay 510, information about a first monitoring time when the wireless relay 510 is movable.

Step 908*f*

This is a substep of step 908, and a step to be performed after step 908*e*. This step corresponds to step 802 in FIG. 8.

In some embodiments, the target node 501, 520 sends, to the wireless relay 510 information about a second monitoring time when the wireless relay 510 is fixed. The first monitoring time is longer than the second monitoring time.

Figure 10A:
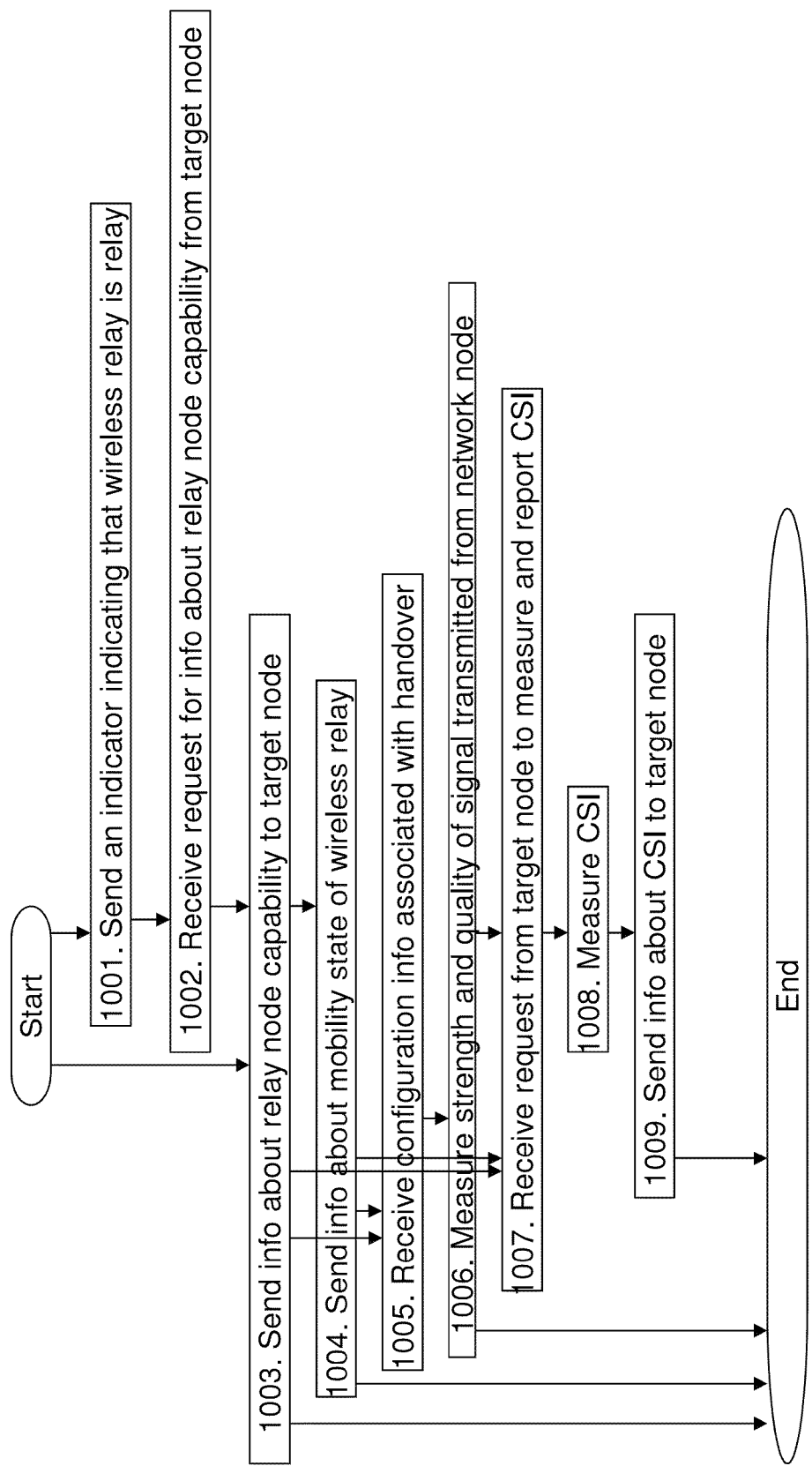
FIG. 10a-b are flow charts illustrating embodiments of a method in a wireless relay.
Figure 10B:
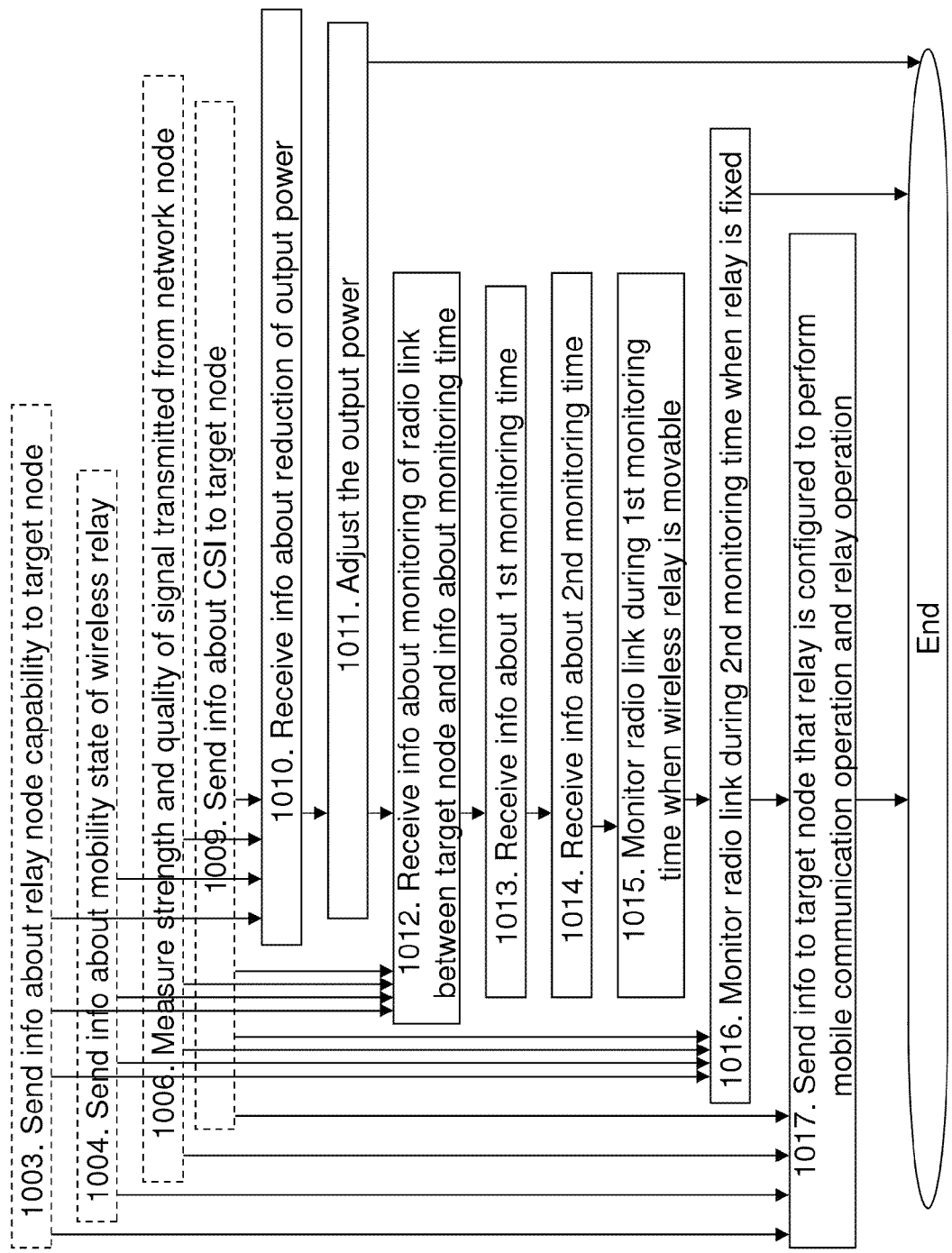

The method described above will now be described seen from the perspective of the wireless relay 510. FIGS. 10*a-b* is a flowchart describing the present method in a wireless relay 510 for enabling a target node 510, 520 to handle capabilities of the wireless relay 510 in a communications network 500. Steps 1003, 1004, 1006 and 1009 are initially shown in FIG. 10*a*. However, they repeated in FIG. 10*b* using dashed lines for the sake of clarity.

The method comprises the following steps to be performed by the wireless relay 510, which steps may be performed in any suitable order:

Step 1001

This step is illustrated in FIG. 10*a*. This step corresponds to step 801 in FIG. 8.

In some embodiments, the wireless relay 510 sends, to the target node 501, 520, an indicator indicating that the wireless relay 510 is a relay.

Step 1002

This step is illustrated in FIG. 10*a*.

In some embodiments, the wireless relay 510 receives, from the target node 501, 520, a request for the information indicating the capability of the wireless relay 510.

In some embodiments, the received request indicates to which one or more receipt node in the communications network 500 the reply to the request is to be sent.

Step 1003

This step is illustrated in FIG. 10*a*. This step corresponds to step 801 in FIG. 8.

The wireless relay 510 sends information indicating a capability of the wireless relay 510 to the target node 501, 520. The information comprises information whether the wireless relay 510 is fixed or movable. The information enables the target node 501, 520 to handle capabilities of a wireless relay 510 in the communications network 500.

In some embodiments, the information is sent from the wireless relay 510 via a network node, to the target node 501, 520.

In some embodiments, the information further comprises information about the wireless relay 510 being a dedicated movable wireless relay, a wireless terminal acting as a movable wireless relay, a wireless terminal dedicated for relay, a wireless terminal acting as a relay with partial mobile and relay operations or a wireless terminal acing as a relay with full mobile and relay operations.

In some embodiments, the information is preconfigured in the wireless relay 510.

In some embodiments, the information is sent using a Radio Resource Control protocol, referred to as RRC, a Long Term Evolution Positioning Protocol, referred to as LPP, or a Media Access Control protocol, referred to as MAC, protocol.

Step 1004

This step is illustrated in FIG. 10*a*. This step corresponds to step 801 in FIG. 8.

In some embodiments, when the wireless relay 510 is movable, the wireless relay 510 sends information about a mobility state of the wireless relay 510 to the target node 501, 520.

Step 1005

This step is illustrated in FIG. 10*a*.

In some embodiments, when the wireless relay 510 is movable, the wireless relay 510 receives, from the target node 501, 520, configuration information associated with an initial selection of the target node 510, 520 or a handover. The configuration information enables the wireless relay 510 to perform a measurement associated with the initial selection of the target node 501, 520 or the handover.

Step 1006

This step is illustrated in FIG. 10*a*.

In some embodiments, when the wireless relay 510 is movable and based on the received configuration information, the wireless relay 510 measures at least one of a strength and quality of a signal transmitted from a network node.

Step 1007

This step is illustrated in FIG. 10*a*. This step corresponds to step 802 in FIG. 8.

In some embodiments, when the wireless relay 510 is movable, the wireless relay 510 receives a request from the target node 510, 520 to measure and report a channel state information, referred to as CSI.

Step 1008

This step is illustrated in FIG. 10*a*. This step corresponds to step 802 in FIG. 8.

In some embodiments, when the wireless relay 510 is movable, the wireless relay 510 measures the requested CSI.

Step 1009

This step is illustrated in FIG. 10*a*. This step corresponds to step 802 in FIG. 8.

In some embodiments, when the wireless relay 510 is movable, the wireless relay 510 sends information about the measured CSI to the target node 501, 520.

Step 1010

This step is illustrated in FIG. 10*b*. This step corresponds to step 802 in FIG. 8.

In some embodiments, when the wireless relay 510 is movable, the wireless relay 510 receives, from the target node 510, 520, information about an adjustment of output power.

Step 1011

This step is illustrated in FIG. 10*b*. This step corresponds to step 802 in FIG. 8.

In some embodiments, when the wireless relay 510 is movable, the wireless relay 510 adjusts the output power. In some embodiments, the adjusting comprises increasing or decreasing the output power.

Step 1012

This step is illustrated in FIG. 10*b*. This step corresponds to step 802 in FIG. 8.

In some embodiments, the wireless relay 510 receives a request from the target node 501, 520 to monitor a radio link between the target node 501, 520.

Step 1013

This step is illustrated in FIG. 10*b*. This step corresponds to step 802 in FIG. 8.

In some embodiments, the wireless relay 510 receives information about a first monitoring time associated to the wireless relay 510 being movable.

Step 1014

This step is illustrated in FIG. 10*b*. This step corresponds to step 802 in FIG. 8.

In some embodiments, the wireless relay 510 receives information about a second monitoring time associated to the wireless relay 510 being fixed. The first monitoring time is longer than the second monitoring time.

Step 1015

This step is illustrated in FIG. 10*b*. This step corresponds to step 802 in FIG. 8.

In some embodiments, the wireless relay 510 monitors the radio link during the first monitoring time when the wireless relay 510 is movable.

Step 1016

This step is illustrated in FIG. 10*b*. This step corresponds to step 802 in FIG. 8.

In some embodiments, the wireless relay 510 monitors the radio link during the second monitoring time when the wireless relay 510 is fixed.

Step 1017

This step is illustrated in FIG. 10b. This step corresponds to step 801 in FIG. 8.

In some embodiments, the wireless relay 510 sends information to the target node 501, 520 that the wireless relay 510 is configured to perform at least one of mobile communication operation and relay operation.

Figure 11:
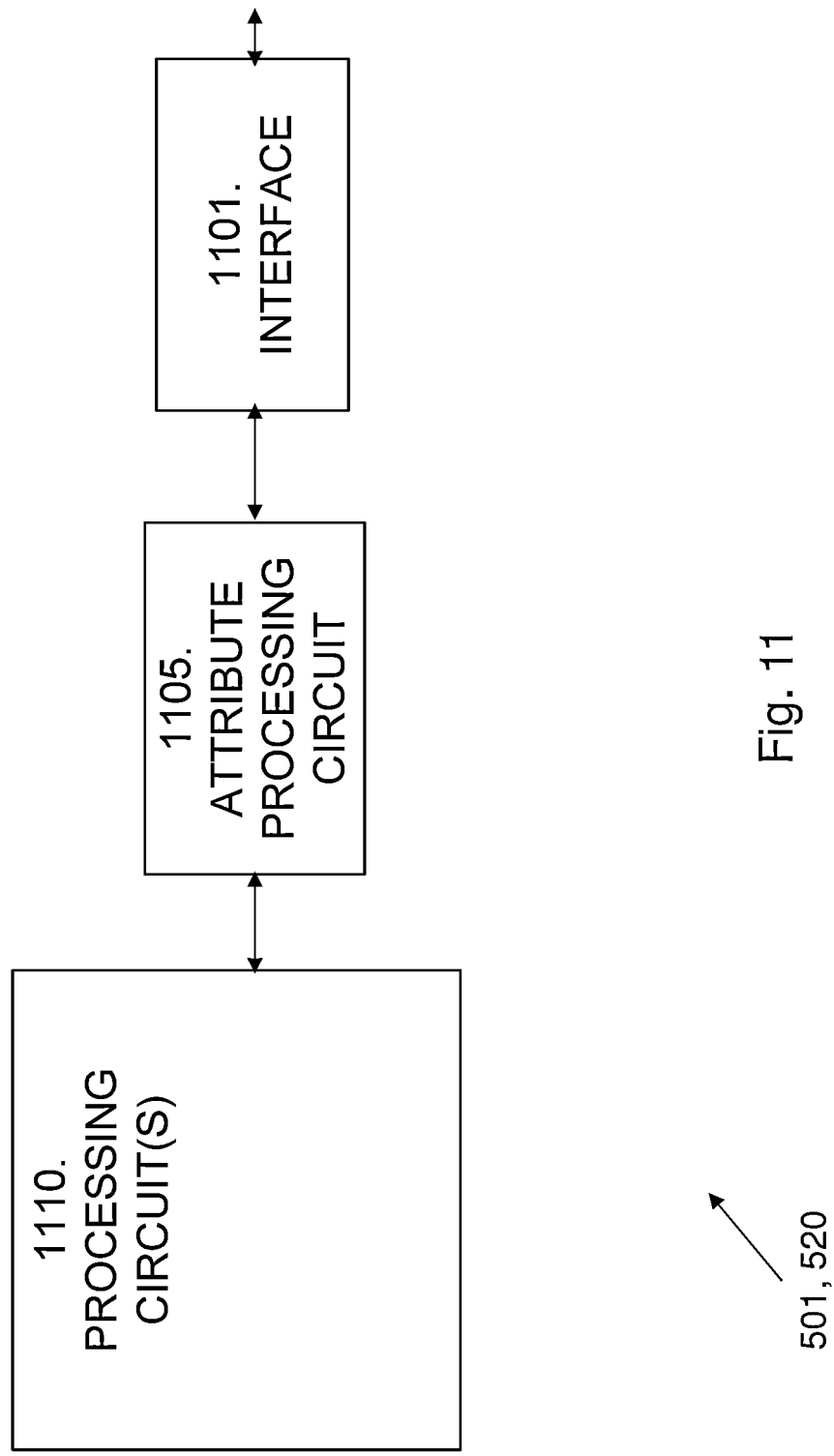
FIG. 11 is a block diagram illustrating components of a target node according to several embodiments

To perform the method steps shown in FIG. 9 for handling capabilities of a wireless relay 510 in a communication network 500, the target node 501, 520 comprises an arrangement as shown in FIG. 11. In some embodiments, the target node 501, 520 is a donor node, a donor base station, a donor NodeB, a donor evolved NodeB, a donor radio network controller, a donor base station controller, a second wireless relay node, a positioning node, a core network node, a base station, a network controller, a self organizing network, referred to as SON, an operation and maintenance node, referred to as O&M, an operational support system node, referred to as OSS, a NodeB or an evolved NodeB.

The target node 501, 520 comprises an interface 1101 configured to communicatively couple the target node 501, 520 to the relay node 510, whether directly or indirectly through an intermediate node.

The target node 501, 520 further comprises an attribute processing circuit 1105 configured to receive information from the relay node 510, via the interface 1101, that identifies one or more attributes specific to the relay node 510. The attribute processing circuit 1105 may be configured to receive this information responsive to having sent a request to the relay node 510 for that information, or to receive the information periodically without having to send a request. In some embodiments, for example, the attribute processing circuit 1105 is configured to determine whether or not the one or more other processing circuits 1110 may perform one or more operations based on at least one of the received attributes, and to configure, i.e., direct, the one or more processing circuits 1110 accordingly.

The attribute processing circuit 1105 is configured to receive, from the wireless relay 510, information indicating a capability of the wireless relay from the wireless relay 510. The information comprises information whether the wireless relay 510 is fixed or movable. In some embodiments, the attribute processing circuit 1105 is further configured to receive the information from the wireless relay 510 via a network node, which network node is a donor node, a donor base station, a donor NodeB, a donor evolved NodeB, a second wireless relay node, a NodeB or an evolved NodeB. The network node may also be referred to as an intermediate node. In some embodiments, the information further comprises information whether the wireless relay 510 is a dedicated movable wireless relay, a wireless terminal acting as a movable wireless relay, a wireless terminal dedicated for relay, a wireless terminal acting as a relay with partial mobile and relay operations or a wireless terminal acing as a relay with full mobile or a relay operations. In some embodiments, the attribute processing circuit 1105 is further configured to receive the information according to a Radio Resource Control protocol, referred to as RRC, a Long Term Evolution Positioning Protocol, referred to as LPP, or according to a Media Access Control protocol, referred to as MAC, protocol.

The attribute processing circuit 1105 is further configured to, based on the received information, determine a procedure to be executed. The determined procedure is dependent on whether the wireless relay 510 is fixed or movable.

In some embodiments, when the wireless relay 510 is movable, the attribute processing circuit 1105 is configured to obtain information about a mobility state of the wireless relay 510, and to determine the procedure to be executed further based on the obtained information about mobility state.

In some embodiments, the attribute processing circuit 1105 is further configured to measure a speed of the movable wireless relay 510, and to, based on the measured speed, determine that the movable wireless relay 510 is stationary or moving. In some embodiments, the attribute processing circuit 1105 is further configured to determine the procedure to be executed further based on whether movable wireless relay is stationary or moving. In some embodiments, the attribute processing circuit 1105 is further configured to obtain the information about the mobility state of the wireless relay 510 by receiving information about the mobility state from the wireless relay 510.

In some embodiments, the attribute processing circuit 1105 is further configured to receive information from the wireless relay 510 that the wireless relay 510 is configured to perform at least one of mobile communication operation and relay operation, and to determine the procedure to be executed further based on the information about the wireless relay 510 being configured to perform at least one of mobile communication operation and relay operation.

In some embodiments, the attribute processing circuit 1105 is further configured to receive, from the wireless relay 510, an indicator indicating that the wireless relay 510 is a relay.

Regardless, the attribute processing circuit 1105 then configures, i.e., directs, one or more other processing circuits 1110 of the target node 501, 520 based on at least one of the received attributes. In some embodiments, the processing circuit 1110 is configured to execute the determined procedure dependent on whether the wireless relay 510 is fixed or movable. In some embodiments, the wireless relay 510 is movable, and the processing circuit 1110 is further configured to send, to the wireless relay 510, configuration information associated with an initial selection of the target node 501, 520 or a handover. The configuration information enables the wireless relay 510 to perform a measurement associated with the initial selection of the first network node or the handover.

In some embodiments, when the wireless relay 510 is movable, processing circuit 1110 is further configured to send a request to the wireless relay 510 to measure and report a channel state information, referred to as CSI.

In some embodiments, when the wireless relay 510 is movable, the processing circuit 1110 is further configured to send information about an adjustment of output power to the wireless relay 510.

In some embodiments, the processing circuit 1110 is further configured to send a request to the wireless relay 510 to monitor a radio link between the target node 501, 520 and the wireless relay 510, to send information about a first monitoring time when the wireless relay 510 is movable, and configured to send information about a second monitoring time when the wireless relay 510 is fixed. The first monitoring time is longer than the second monitoring time.

In some embodiments, the processing circuit 1110 is further configured to send, to the wireless relay 510, a request for information of the capability of the wireless relay 510. In some embodiments, the sent request indicates to which receipt nodes in the communications network 500 the reply to the request is to be sent. In some embodiments, the processing circuit 1110 is further configured to perform network planning and management based on the received information. In some embodiments, the processing circuit 1110 is further configured to set a maximum output power of the wireless relay 510, and/or determine a number of target nodes 501, 520 to serve the wireless relay 510, and/or determine a hardware resource of the target node 501, 520, and/or to determine a radio resource in the target node 501, 520.

In some embodiments, the one or more processing circuits 1110 may comprise a handover assistance circuit, a channel report requesting circuit, a mobility circuit, a measurement configuration circuit, a link monitoring circuit, and/or an emission requirements circuit. In this case, the attribute processing circuit 1105 may respectively configure these circuits to transmit handover assistance information to the relay node 510, request channel state information reports, perform mobility procedures, perform measurement configurations, monitor radio link quality, and/or transmit localized out-of-band emission requirements to the relay node 510, if one of the received attributes indicates the relay node is a fixed node. By contrast, the attribute processing circuit 1105 may configure the circuits to refrain from any or all of those operations, or to at least perform those operations less frequently, if one of the received attributes indicates the relay node 510 is a mobile node. The target node 501, 520 may of course comprise other processing circuits 1110 that are configured by the attribute processing circuit 1105 to perform or not perform the other network operations discussed above, depending on the received attributes.

Figure 12:
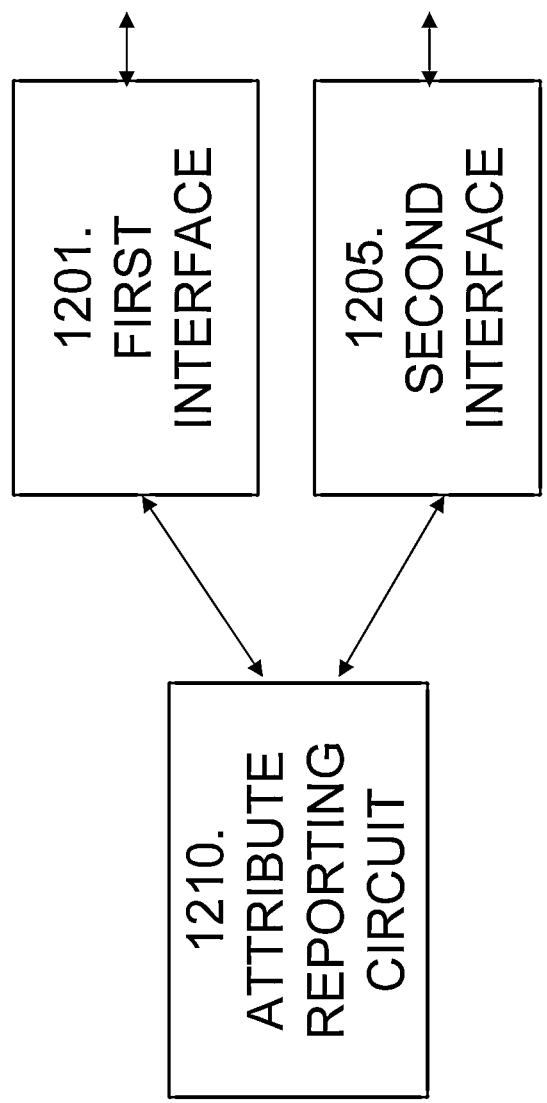
FIG. 12 is a block diagram illustrating components of a relay node according to several embodiments.

To perform the method steps shown in FIG. 10 for handling capabilities of a wireless relay 510 in a communication network 500, the wireless relay 510 comprises an arrangement as shown in FIG. 12.

The relay node comprises a first interface 1201 configured to communicatively couple the relay node 510 to one or more mobile terminals, i.e. user equipments 505.

The relay node 510 also comprises a second interface 1205 configured to communicatively couple the relay node 510 to a target node 501, 520 in the wireless communication network 500, whether directly or via an intermediate node between the relay node 510 and the target node 501, 520.

The relay node 510 further comprises an attribute reporting circuit 1210 configured to send information to the target node 501, 520, via the second interface 1205, that identifies one or more attributes specific to the relay node 510. As discussed above, these attributes in some embodiments comprise static characteristics or features that distinguish the relay node 510 from other relay nodes 510, and in other embodiments additionally or alternatively comprise dynamic characteristics or states of the relay node 510 that distinguish the relay node's operation at one time from that at another time.

The attribute reporting circuit 1210 is configured to send information indicating a capability of the wireless relay to the target node 501, 520. The information comprises information whether the wireless relay 510 is fixed or movable, and which information enables the target node 501, 520 to handle capabilities of a wireless relay 510 in the communications network 500. In some embodiments, the information is sent from the wireless relay 510 via a network node, to the target node 501, 520. In some embodiments, the information further comprises information about the wireless relay 510 being a dedicated movable wireless relay, a wireless terminal acting as a movable wireless relay, a wireless terminal dedicated for relay, a wireless terminal acting as a relay with partial mobile and relay operations or a wireless terminal acing as a relay with full mobile and relay operations. In some embodiments, the information is preconfigured in the wireless relay 510. In some embodiments, the information is sent using a Radio Resource Control protocol, referred to as RRC, a Long Term Evolution Positioning Protocol, referred to as LPP, or a Media Access Control protocol, referred to as MAC, protocol.

In some embodiments, when the wireless relay 510 is movable, the attribute reporting circuit 1201 is further configured to send information about a mobility state of the wireless relay 510 to the target node 501, 520.

In some embodiments, the attribute reporting circuit 1205 is further configured to receive a request from the target node 501, 520 to monitor a radio link between the target node 501, 520, to receive information about a first monitoring time associated to the wireless relay 510 being movable, and to receive information about a second monitoring time associated to the wireless relay 510 being fixed. The first monitoring time is longer than the second monitoring time. The attribute reporting circuit 1205 may be further configured to monitor the radio link during the first monitoring time when the wireless relay 510 is movable, and to monitor 1014 the radio link during the second monitoring time when the wireless relay 510 is fixed.

In some embodiments, when the wireless relay 510 is movable, the attribute reporting circuit 1205 is further configured to receive, from the target node 501, 520, configuration information associated with an initial selection of the target node 501, 520 or a handover. The configuration information enables the wireless relay 510 to perform a measurement associated with the initial selection of the target node 501, 520 or the handover. The attribute reporting circuit 1205 may be further configured to, based on the received configuration information, measure at least one of a strength and quality of a signal transmitted from a network node.

In some embodiments, when the wireless relay 510 is movable, the attribute reporting circuit 1205 is further configured to receive a request from the target node 501, 520 to measure and report a channel state information, referred to as CSI, measure the requested CSI, and to send information about the measured CSI to the target node 501, 520.

In some embodiments, when the wireless relay 510 is movable, the attribute reporting circuit 1205 is further configured to receive, from the target node 501, 520, information about an adjustment of output power, and to adjust the output power.

In some embodiments, the attribute reporting circuit 1205 is further configured to send information to the target node 501, 520 that the wireless relay 510 is configured to perform at least one of mobile communication operation and relay operation.

In some embodiments, the attribute reporting circuit 1205 is further configured to receive, from the target node 501, 520, a request for the information indicating the capability of the wireless relay 510. In some embodiments, the received request indicates to which one or more receipt node in the communications network 500 the reply to the request is to be sent.

In some embodiments, the attribute reporting circuit 1205 is further configured to send, to the target node 501, 520, an indicator indicating that the wireless relay 510 is a relay.

Figure 13:
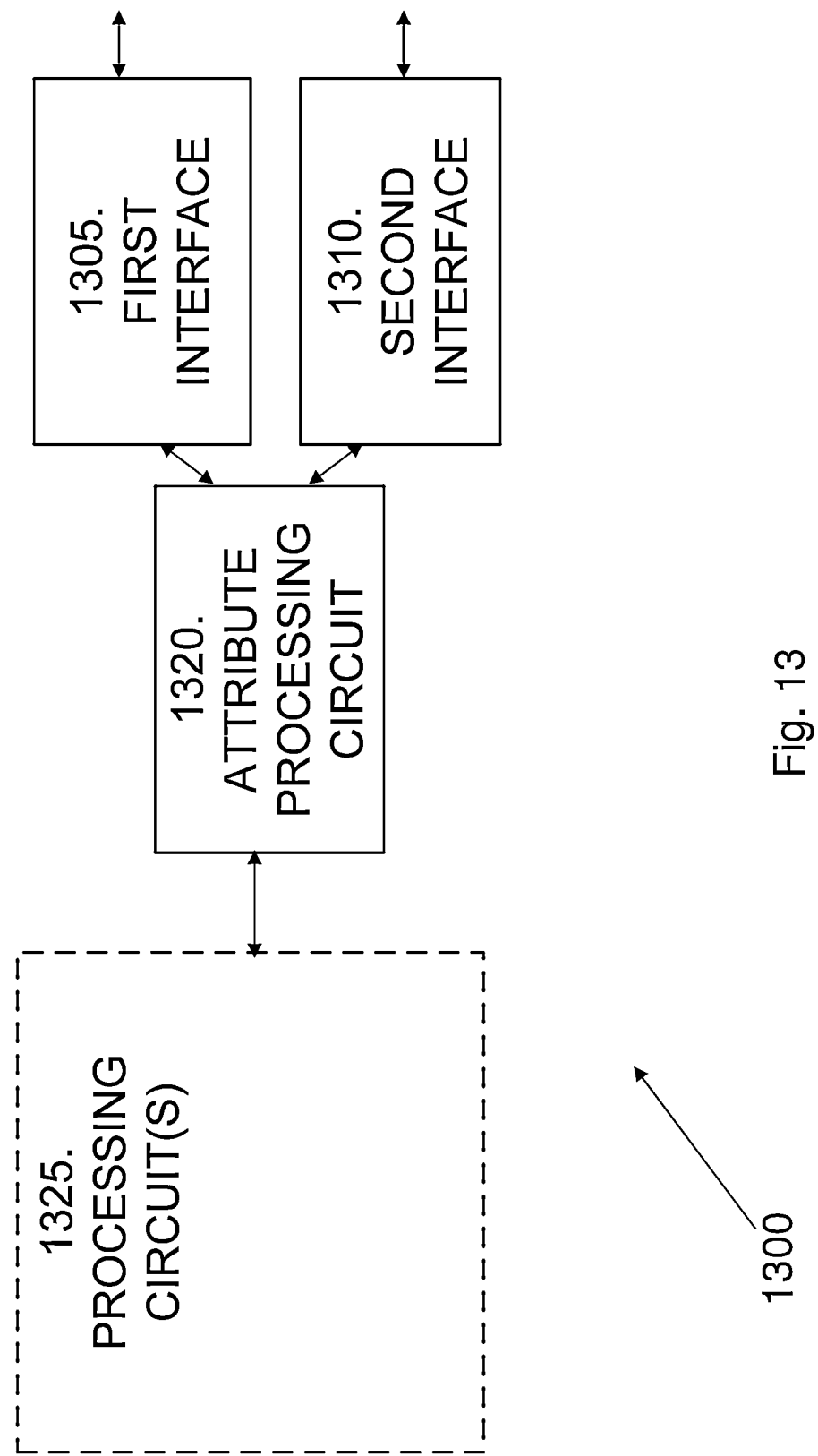
FIG. 13 is a block diagram illustrating embodiments of an intermediate node.

Embodiments herein further comprise an intermediate node located between a relay node 510 and a target node 501, 520 in a wireless communication network. FIG. 13 depicts an example intermediate node 1300. The intermediate node 1300 is referred to as network node or second network node 501 in the above description. The intermediate node 1300 comprises a first interface 1305 configured to communicatively couple the intermediate node 1300 to the relay node 510, and likewise comprises a second interface 1310 configured to communicatively couple the intermediate node 1300 to the target node 501, 510. The intermediate node 1300 also comprises an attribute processing circuit 1320 configured to receive information from the relay node 510, via the first interface 1305, that identifies one or more attributes specific to the relay node 510. The attribute processing circuit 1320 may be configured to receive this information responsive to having sent a request to the relay node 510 for that information, or to receive the information periodically without having to send a request. Regardless, in some embodiments, the attributes processing circuit 1320 is configured to modify this information and to then send the modified information to the target node 501, 520 via the second interface 1310. In other embodiments, the attributes processing circuit 1320 additionally or alternatively configures, i.e., directs, one or more other processing circuits 1325 of the intermediate node 1300 based on at least one of the received attributes.

Figure 1:
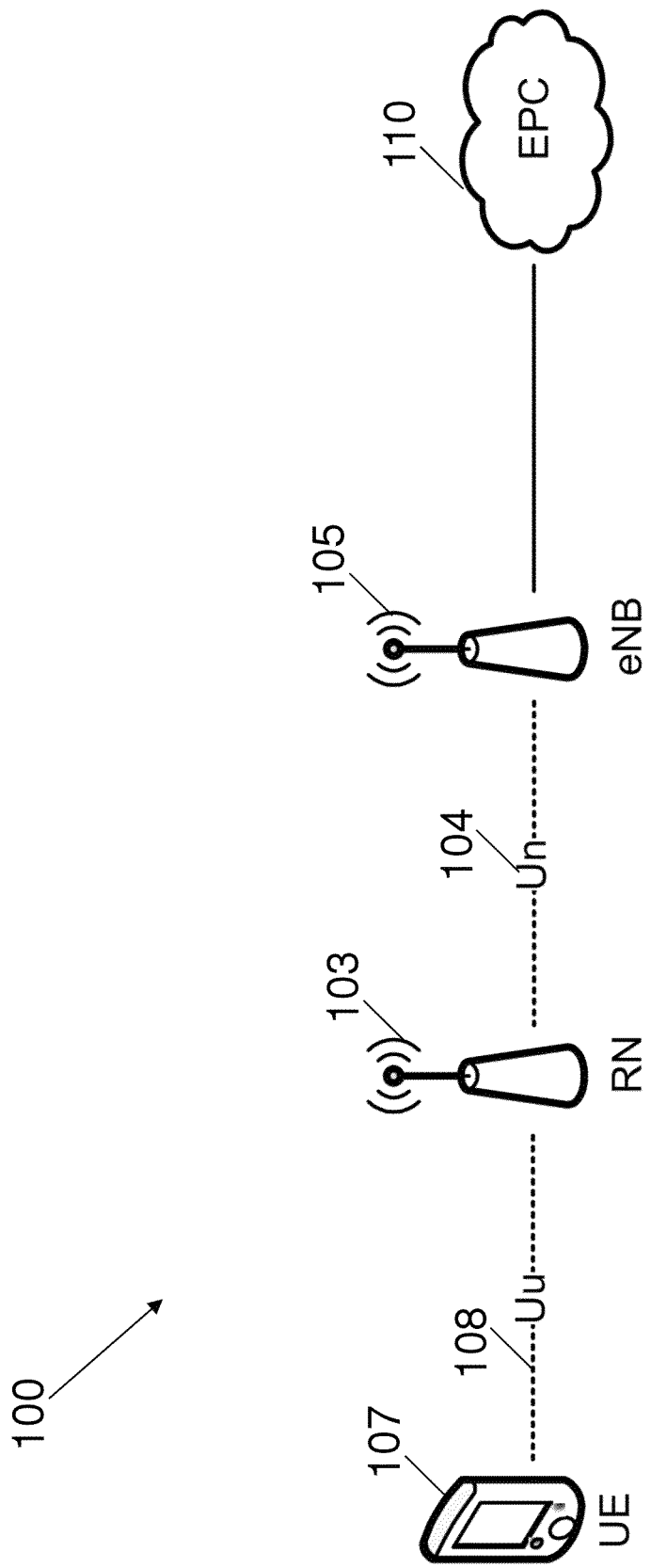
FIG. 1 is a block diagram illustrating an overview of a relay architecture in LTE.
Figure 2:
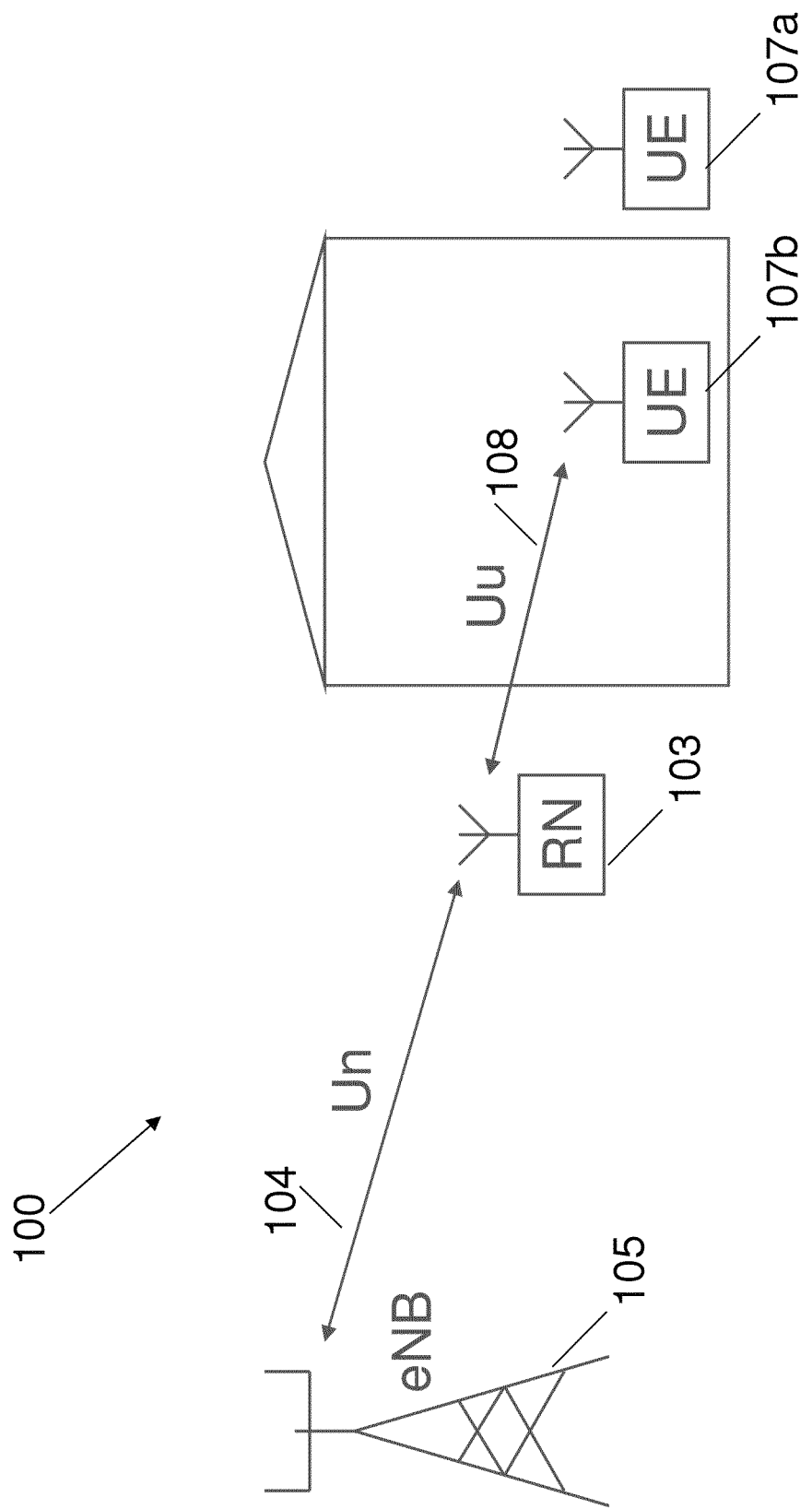
FIG. 2 is a block diagram illustrating an outdoor relay deployment.
Figure 3:
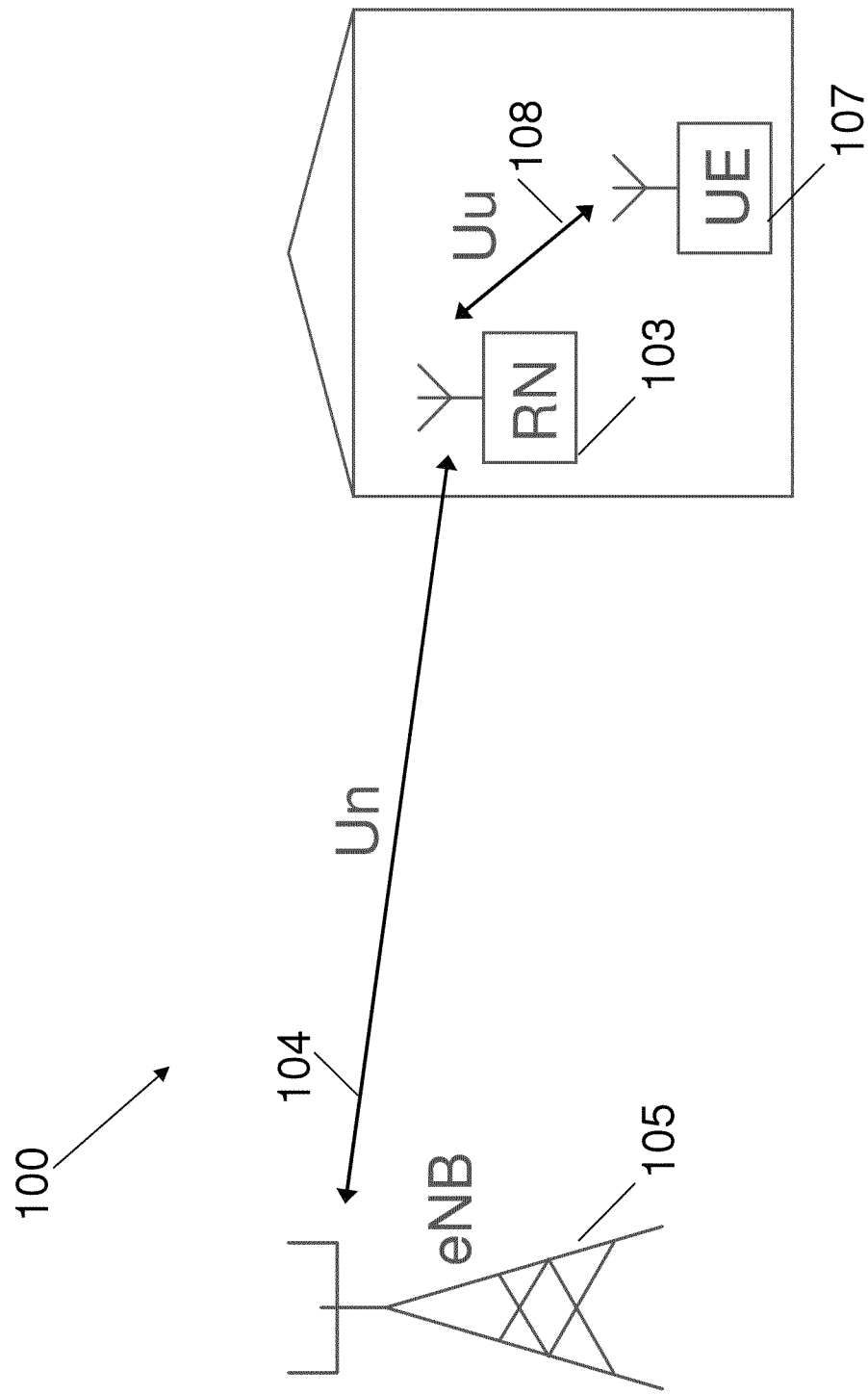
FIG. 3 is a block diagram illustrating an Indoor relay deployment.
Figure 4:
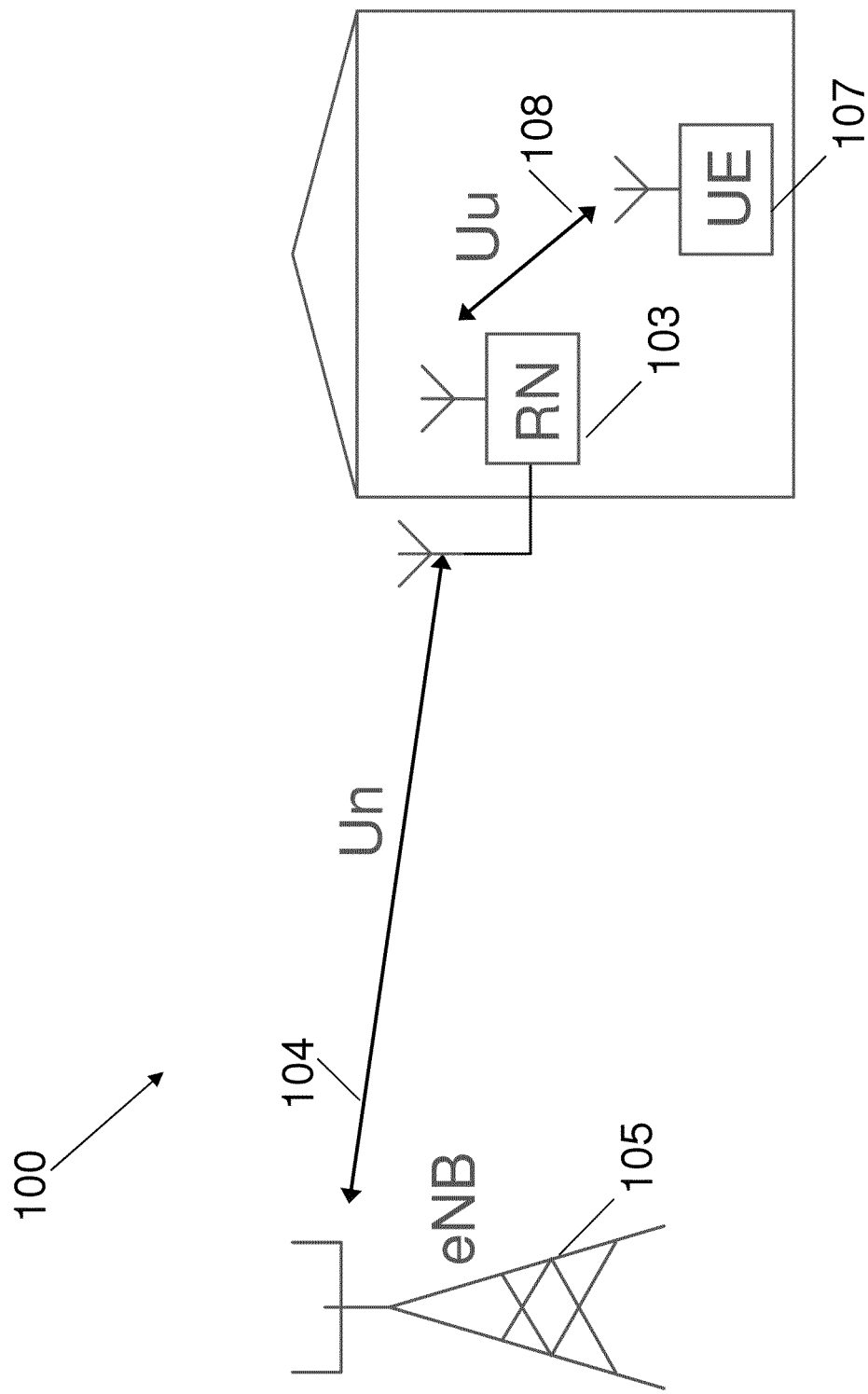
FIG. 4 is a block diagram illustrating an indoor relay deployment with outdoor backhaul antennas; thru-wall scenario.

The present mechanism for handle capabilities of the wireless relay 510 in a communication network 300 may be implemented through one or more processors, such as a processing circuit 1110 in the target node 501, 520 depicted in FIG. 1 and a attribute processing circuit 1219 in the wireless relay 510 depicted in FIG. 12, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into target node 501, 520 and/or wireless relay 510 One such carrier may be in the form of a CD ROM disc. It is however feasible with other data carriers such as a memory stick. The computer program code may furthermore be provided as pure program code on a server and downloaded to the into target node 501, 520 and/or wireless relay 510 remotely.

Summarized, in some embodiments, network operation is particularized for relay node attributes that comprise certain, static characteristics or features that distinguish one relay node 510 from another. These static characteristics or features comprise, for example, the type of a relay node 510 in broad terms of whether or not a relay node 510 is fixed, i.e., permanently or semi-permanently affixed to some non-movable structure, or mobile. Network operation particularized for a mobile relay node 510 may comprise transmitting handover assistance information to that relay node 510, requesting channel state information reports, performing mobility procedures and measurement configurations, monitoring radio link quality, and/or transmitting localized out-of-band emission requirements to the relay node 510. By contrast, network operation particularized for a fixed relay node 510 may comprise refraining from any or all of those operations, or at least performing those operations less frequently.

Static characteristics or features of a mobile relay node 510, in particular, may also more specifically comprise whether the mobile relay node 510 is a dedicated mobile relay node, i.e., permanently or semi-permanently affixed to some movable structure, a wireless terminal temporarily acting as a relay node 510, or a dedicated wireless terminal that always acts as a relay node 510, but is not affixed to a structure. Network operation particularized for a dedicated mobile relay node 510 may comprise requesting channel state information reports from the relay node 510 less frequently and/or with more channel information than those requested from a wireless terminal temporarily acting as a relay node 510.

In other embodiments, network operation is particularized for relay node attributes that additionally or alternatively comprise certain, dynamic characteristics or states of a relay node 510 that distinguish a relay node's operation at one time from that at another time. These dynamic characteristics or states comprise, for example, the current mobility state of a mobile relay node 510, i.e., whether the mobile relay node 510 is presently stationary or moving, and, if moving, with what speed, etc. Network operation particularized for a mobile relay node 510 that is presently stationary, or moving relatively slowly, may comprise requesting channel state information reports from the relay node 510 less frequently and/or with more channel information than those requested from a mobile relay node 510 that is moving relatively quickly.

The dynamic characteristics or states of a wireless terminal that may temporarily act as a relay node 510 may also comprise whether or not that terminal is presently acting as a relay node 510, and, if so, to what extent. Network operation particularized for a wireless terminal that is presently acting as a relay node 510 may comprise requesting link measurement reports from the terminal. By contrast, network operation particularized for a wireless terminal that is not presently acting as a relay node 510 may comprise refraining from requesting such reports. Further, network operation particularized for a wireless terminal that is presently acting as a relay node 510, but only to a certain extent, e.g., in order for the terminal to still retain some of its normal or primary functionality, its relay functionality is only partially performed, may comprise refraining from using certain types of positioning or carrier aggregation schemes.

Another advantage of the embodiments herein is that the recognition of different varieties of relays in terms of deployment, mobility etc. enable the network to uniquely identify the type and characteristics of relays.

Another advantage of the embodiments herein is that since the target node is able to distinguish between the different types or relay nodes, procedures specific to a particular relay type may be executed, all of the relay functions are operable, and the full potential of the relays is utilized.

A further advantage is that the embodiments provide motivation to deploy relays of different types, which are beneficial in different environments and scenarios.

According to the embodiments herein, an advantage of uniquely identifying a particular type of relay lies in the fact that actions, tasks or procedures specific to a particular relay type may be carried out by a relevant node. The relay type capability may also be exploited to perform network planning and management and thus improve overall network performance.

According to the embodiments herein, an advantage of uniquely identifying a particular type of relay lies in the fact that the network planning and configuration of parameters may be done in an automated fashion. This in turn avoid manual task and improves the network planning in general.

According to the embodiments herein, an advantage of uniquely identifying a particular type of relay lies in the fact that optimal network performance may be achieved by executing the most relevant procedure in accordance with the type of relay in use.

According to the embodiments herein, an advantage of uniquely identifying a particular type of relay lies in the fact that the radio resources may be utilized more efficient by selecting the most relevant procedure related to radio network operation. This will in turn increase the system capacity and also lower interference in the network.

The reported relay type capability may be one of the pre-determined relay types, which were described in the previous section. If the relay types are pre-determined then the relay may signal an identifier corresponding to its relay type capability. In this way the embodiments herein provide the advantage of reduced signaling overhead.

The relay type capability reporting enables the target node to explicitly and fully identify the relay characteristics. This comprises two advantages. First, the network may execute the procedures which are relevant to the characteristics of the relay or the network may provide necessary information, e.g. parameter values, to assist the relay to perform specific tasks. Second, the network may use this capability information for performing certain network planning and management.

The embodiments herein are also applicable to any type of RAT, LTE, HSPA, GSM, CDMA2000, HRPD, Wimax etc, or a relay 510 comprising of the mixture of RATs, e.g. MSR relays. Furthermore the MSR or non-MSR relay may comprise of contiguous carriers or non-contiguous carriers. Embodiments herein are further applicable to a relay 510 which supports carrier aggregation or multi-carrier operation or multi-carrier-multi-RAT operation. Furthermore embodiments are applicable to all different types and categories of relays 510 which may operate in single hop relay system or in multi-hop relay system.

The embodiments herein are not limited to the above described preferred embodiments. Various alternatives, modifications and equivalents may be used. Therefore, the above embodiments may not be taken as limiting the scope of the embodiments, which is defined by the appending claims.

It may be emphasized that the term "comprises/comprising" when used in this specification is taken to specify the presence of stated features, integers, steps or components, but does not preclude the presence or addition of one or more other features, integers, steps, components or groups thereof. It may also be noted that the words "a" or "an" preceding an element do not exclude the presence of a plurality of such elements.

It may also be emphasized that the steps of the methods defined in the appended claims may, without departing from the embodiments herein, be performed in another order than the order in which they appear in the claims.

The invention claimed is:

1. A method in a target node for handling capabilities of a wireless relay in a communications network, the method comprising:
   receiving, from the wireless relay, information indicating a capability of the wireless relay, which information indicates whether the wireless relay is fixed or movable; and
   based on the received information, determining a procedure to be executed, which procedure is dependent on whether the wireless relay is fixed or movable wherein when the wireless relay is movable, determining to execute the procedure in full, and wherein when the wireless relay is fixed, determining to execute the procedure only in part or determining to execute the procedure less frequently compared to when the wireless relay is movable.

2. The method according to claim 1, further comprising executing the determined procedure dependent on whether the wireless relay is fixed or movable.

3. The method according to claim 1, wherein the wireless relay is movable, wherein the method further comprises obtaining information about a mobility state of the wireless relay, and wherein the determining the procedure to be executed is further based on the obtained information about mobility state.

4. The method according to claim 3, wherein the obtaining information about the mobility state of the wireless relay further comprises:
   measuring a speed of the movable wireless relay; and
   based on the measured speed, determining that the movable wireless relay is stationary or moving,
   wherein determining the procedure to be executed is further based on whether the movable wireless relay is stationary or moving.

5. The method according to claim 3, wherein the information about the mobility state of the wireless relay is obtained by receiving information about the mobility state from the wireless relay.

6. The method according to claim 2, wherein the wireless relay is movable, and wherein the executing the determined procedure dependent on the wireless relay is fixed or movable further comprises:
   sending, to the wireless relay, configuration information associated with an initial selection of the target node or a handover, which configuration information enables the wireless relay to perform a measurement associated with the initial selection of the target node or the handover.

7. The method according to claim 2, wherein the wireless relay is movable, and wherein the executing the determined procedure dependent on whether the wireless relay is fixed or movable further comprises:
   sending a request to the wireless relay to measure and report a channel state information (CSI).

8. The method according to claim 2, wherein the wireless relay is movable, and wherein the executing the determined procedure dependent on whether the wireless relay is fixed or movable further comprises:
   sending information about an adjustment of output power to the wireless relay.

9. The method according to claim 2, wherein the executing the determined procedure dependent on whether the wireless relay is fixed or movable further comprises:
   sending a request to the wireless relay to monitor a radio link between the target node and the wireless relay;
   sending, to the wireless relay, information about a first monitoring time when the wireless relay is movable; and
   sending, to the wireless relay, information about a second monitoring time when the wireless relay is fixed, the first monitoring time being longer than the second monitoring time.

10. The method according to claim 1, further comprising:
    receiving information from the wireless relay that the wireless relay is configured to perform at least one of mobile communication operation and relay operation; and
    wherein the determining the procedure to be executed is further based on the information about the wireless relay being configured to perform at least one of mobile communication operation and relay operation.

11. The method according to claim 1, further comprising:
    sending, to the wireless relay, a request for information of the capability of the wireless relay.

12. The method according to claim 11, wherein the sent request indicates to which receipt nodes in the communications network the reply to the request is to be sent.

13. The method according to claim 1, further comprising performing network planning and management based on the received information.

14. The method according to claim 13, wherein the performing network planning and management based on the received information further comprises at least one of:
    setting a maximum output power of the wireless relay;
    determining a number of target nodes to serve the wireless relay;
    determining a hardware resource of the target node; and
    determining a radio resource in the target node.

15. The method according to claim 1, further comprising:
receiving, from the wireless relay, an indicator indicating that the wireless relay is a relay.

16. The method according to claim 1, wherein the information is received from the wireless relay via a network node, which network node is a donor node, a donor base station, a donor NodeB, a donor evolved NodeB, a second wireless relay node, a NodeB or an evolved NodeB.

17. The method according to claim 1, wherein the information further comprises information whether the wireless relay is a dedicated movable wireless relay, a wireless terminal acting as a movable wireless relay, a wireless terminal dedicated for relay, a wireless terminal acting as a relay with partial mobile and relay operations, or a wireless terminal acing as a relay with full mobile or a relay operations.

18. The method according to claim 1, wherein the information is received according to a Radio Resource Control (RRC) protocol, a Long Term Evolution Positioning Protocol (LPP), or according to a Media Access Control (MAC) protocol.

19. The method according to claim 1, wherein the target node is a donor node, a donor base station, a donor NodeB, a donor evolved NodeB, a donor radio network controller, a donor base station controller, a second wireless relay node, a positioning node, a core network node, a base station, a network controller, a self organizing network (SON), an operation and maintenance (O&M) node, an operational support system (OSS) node, a NodeB or an evolved NodeB.

20. A method in a wireless relay for enabling a target node to handle capabilities of the wireless relay in a communications network, the method comprising:
sending information indicating a capability of the wireless relay to the target node, which information comprises information whether the wireless relay is fixed or movable, and which information enables the target node to handle capabilities of a wireless relay in the communications network; and
receiving indications, dependent on the sent information, for one or more tasks to perform complementary to a first procedure or a second procedure executed by the target node, wherein the target node executes the first procedure in response to the sent information indicating the wireless relay is movable and executes the second procedure in response to the sent information indicating the wireless relay is fixed, and wherein the second procedure is only part of the first procedure or is executed less frequently than the first procedure.

21. The method according to claim 20, wherein the wireless relay is movable, and wherein the method further comprises:
sending information about a mobility state of the wireless relay to the target node.

22. The method according to claim 20, wherein the wireless relay is movable, and wherein the method further comprises:
receiving, from the target node, configuration information associated with an initial selection of the target node or a handover, which configuration information enables the wireless relay to perform a measurement associated with the initial selection of the target node or the handover; and
based on the received configuration information, measuring at least one of a strength and quality of a signal transmitted from a network node.

23. The method according to claim 20,
wherein the wireless relay is movable, and wherein receiving indications for one or more tasks to perform comprises receiving a request from the target node to measure and report a channel state information (CSI);
wherein the method further comprises:
measuring the requested CSI; and
sending information about the measured CSI to the target node.

24. The method according to claim 20, wherein the wireless relay is movable, and wherein the method further comprises:
receiving, from the target node information about an adjustment of output power; and
adjusting the output power.

25. The method according to claim 20,
wherein receiving indications for one or more tasks to perform comprises receiving a request from the target node to monitor a radio link between the target node; and
wherein the method further comprises:
receiving information about a first monitoring time associated to the wireless relay being movable;
receiving information about a second monitoring time associated to the wireless relay being fixed, the first monitoring time being longer than the second monitoring time;
monitoring the radio link during the first monitoring time when the wireless relay is movable; and
monitoring the radio link during the second monitoring time when the wireless relay is fixed.

26. The method according to claim 20, further comprising:
sending information to the target node that the wireless relay is configured to perform at least one of mobile communication operation and relay operation.

27. The method according to claim 20, further comprising:
receiving, from the target node, a request for the information indicating the capability of the wireless relay.

28. The method according to claim 27, wherein the received request indicates to which one or more receipt nodes in the communications network the reply to the request is to be sent.

29. The method according to claim 20, further comprising:
sending, to the target node, an indicator indicating that the wireless relay is a relay.

30. The method according to claim 20, wherein the information is sent from the wireless relay, via a network node, to the target node.

31. The method according to claim 20, wherein the information further comprises information about the wireless relay being a dedicated movable wireless relay, a wireless terminal acting as a movable wireless relay, a wireless terminal dedicated for relay, a wireless terminal acting as a relay with partial mobile and relay operations, or a wireless terminal acing as a relay with full mobile and relay operations.

32. The method according to claim 20, wherein the information is preconfigured in the wireless relay.

33. The method according to claim 20, wherein the information is sent using a Radio Resource Control (RRC) protocol, a Long Term Evolution Positioning Protocol (LPP), or a Media Access Control (MAC) protocol.

34. A target node for handling capabilities of a wireless relay in a communications network, the target node comprising:
an attribute processing circuit configured to:
receive, from the wireless relay, information indicating a capability of the wireless relay, which information comprises information whether the wireless relay is fixed or movable; and
based on the received information, determine a procedure to be executed, which procedure is dependent on whether the wireless relay is fixed or movable, wherein when the wireless relay is movable, determining to execute the procedure in full, and wherein when the wireless relay is fixed, determining to execute the procedure only in part or determining to execute the procedure less frequently compared to when the wireless relay is movable.

35. The target node according to claim 34, further comprising
a processing circuit configured to execute the determined procedure dependent on whether the wireless relay is fixed or movable.

36. The target node according to claim 34, wherein the wireless relay is movable, and wherein the attribute processing circuit is further configured to:
obtain information about a mobility state of the wireless relay; and
determine the procedure to be executed further based on the obtained information about mobility state.

37. The target node according to claim 36, wherein the attribute processing circuit is further configured to:
measure a speed of the movable wireless relay;
based on the measured speed, determine that the movable wireless relay is stationary or moving, and
determine the procedure to be executed further based on whether the movable wireless relay is stationary or moving.

38. The target node according to claim 36, wherein the attribute processing circuit is further configured to obtain the information about the mobility state of the wireless relay by receiving information about the mobility state from the wireless relay.

39. The target node according to claim 35, wherein the wireless relay is movable, and wherein the processing circuit is further configured to send, to the wireless relay, configuration information associated with an initial selection of the target node or a handover, which configuration information enables the wireless relay to perform a measurement associated with the initial selection of the first network node or the handover.

40. The target node according to claim 35, wherein the wireless relay is movable, and wherein the processing circuit is further configured to send a request to the wireless relay to measure and report a channel state information (CSI).

41. The target node according to claim 35, wherein the wireless relay is movable, and wherein the processing circuit is further configured to send information about an adjustment of output power to the wireless relay.

42. The target node according to claim 35, wherein the processing circuit is further configured to:
send a request to the wireless relay to monitor a radio link between the target node and the wireless relay;
send information about a first monitoring time when the wireless relay is movable; and
send information about a second monitoring time when the wireless relay is fixed, the first monitoring time being longer than the second monitoring time.

43. The target node according to claim 34, wherein the attribute processing circuit is further configured to
receive information from the wireless relay that the wireless relay is configured to perform at least one of mobile communication operation and relay operation; and
determine the procedure to be executed further based on the information about the wireless relay being configured to perform at least one of mobile communication operation and relay operation.

44. The target node according to claim 34, wherein the processing circuit is further configured to send, to the wireless relay, a request for information of the capability of the wireless relay.

45. The target node according to claim 44, wherein the sent request indicates to which receipt nodes in the communications network the reply to the request is to be sent.

46. The target node according to claim 34, wherein the processing circuit is further configured to perform network planning and management based on the received information.

47. The target node according to claim 46, wherein the processing circuit is further configured to at least one of:
set a maximum output power of the wireless relay;
determine a number of target nodes to serve the wireless relay;
determine a hardware resource of the target node; and
determine a radio resource in the target node.

48. The target node according to claim 34, wherein the attribute processing circuit is further configured to receive, from the wireless relay, an indicator indicating that the wireless relay is a relay.

49. The target node according to claim 34, wherein the attribute processing circuit is further configured to receive the information from the wireless relay via a network node, which network node is a donor node, a donor base station, a donor NodeB, a donor evolved NodeB, a second wireless relay node, a NodeB or an evolved NodeB.

50. The target node according to claim 34, wherein the information further comprises information whether the wireless relay is a dedicated movable wireless relay, a wireless terminal acting as a movable wireless relay, a wireless terminal dedicated for relay, a wireless terminal acting as a relay with partial mobile and relay operations, or a wireless terminal acing as a relay with full mobile or a relay operations.

51. The target node according to claim 34, wherein the attribute processing circuit is further configured to receive the information according to a Radio Resource Control (RRC) protocol, a Long Term Evolution Positioning Protocol (LPP), or according to a Media Access Control (MAC) protocol.

52. The target node according to claim 34, wherein the target node is a donor node, a donor base station, a donor NodeB, a donor evolved NodeB, a donor radio network controller, a donor base station controller, a second wireless relay node, a positioning node, a core network node, a base station, a network controller, a self organizing network (SON), an operation and maintenance (O&M) node, an operational support system (OSS) node, a NodeB or an evolved NodeB.

53. A wireless relay for enabling a target node to handle capabilities of the wireless relay in a communications network, the wireless relay comprising:
an attribute reporting circuit configured to send information indicating a capability of the wireless relay to the target node, which information comprises information indicating whether the wireless relay is fixed or movable, and which information enables the target node to handle capabilities of a wireless relay in the communications network; and
a receiver circuit configured to receive indications, dependent on the sent information, for one or more tasks to perform complementary to a first procedure or a second procedure executed by the target node, wherein the target node executes the first procedure in response to the sent information indicating the wireless relay is movable and executes the second procedure in response to the sent information indicating the wireless relay is fixed, and wherein the second procedure is only part of the first procedure or executed less frequently than the first procedure.

54. The wireless relay according to claim 53, wherein the wireless relay is movable, and wherein the attribute reporting circuit is further configured to send information about a mobility state of the wireless relay to the target node.

55. The wireless relay according to claim 53, wherein the receiver circuit is further configured to:
receive the indications for one or more tasks to perform comprising a request from the target node to monitor a radio link between the target node;
receive information about a first monitoring time associated to the wireless relay being movable;
receive information about a second monitoring time associated to the wireless relay being fixed, the first monitoring time being longer than the second monitoring time;
monitor the radio link during the first monitoring time when the wireless relay is movable; and
monitor the radio link during the second monitoring time when the wireless relay is fixed.

56. The wireless relay according to claim 53, wherein the wireless relay is movable, and wherein the attribute reporting circuit is further configured to:
receive, from the target node, configuration information associated with an initial selection of the target node or a handover, which configuration information enables the wireless relay to perform a measurement associated with the initial selection of the target node or the handover; and
based on the received configuration information, measure at least one of a strength and quality of a signal transmitted from a network node.

57. The wireless relay according to claim 53, wherein the wireless relay is movable, and the attribute reporting circuit is further configured to:
receive the indications for one or more tasks to perform comprising a request from the target node to measure and report a channel state information, referred to as CSI;
measure the requested CSI; and
send information about the measured CSI to the target node.

58. The wireless relay according to claim 53, wherein the wireless relay is movable, and the attribute reporting circuit is further configured to:
receive, from the target node, information about an adjustment of output power; and
adjust the output power.

59. The wireless relay according to claim 53, wherein the attribute reporting circuit is further configured to send information to the target node that the wireless relay is configured to perform at least one of mobile communication operation and relay operation.

60. The wireless relay according to claim 53, wherein the attribute reporting circuit is further configured to receive, from the target node, a request for the information indicating the capability of the wireless relay.

61. The wireless relay according to claim 60, wherein the received request indicates to which one or more receipt nodes in the communications network the reply to the request is to be sent.

62. The wireless relay according to claim 53, wherein the attribute reporting circuit is further configured to send, to the target node, an indicator indicating that the wireless relay is a relay.

63. The wireless relay according to claim 53, wherein the information is sent from the wireless relay, via a network node, to the target node.

64. The wireless relay according to claim 53, wherein the information further comprises information about the wireless relay being a dedicated movable wireless relay, a wireless terminal acting as a movable wireless relay, a wireless terminal dedicated for relay, a wireless terminal acting as a relay with partial mobile and relay operations or a wireless terminal acing as a relay with full mobile and relay operations.

65. The wireless relay according to claim 53, wherein the information is preconfigured in the wireless relay.

66. The wireless relay according to claim 63, wherein the information is sent using a Radio Resource Control (RRC) protocol, a Long Term Evolution Positioning Protocol (LPP), or a Media Access Control (MAC) protocol.

67. The method according to claim 1, wherein the information indicating a capability of the wireless relay further comprises static characteristics that distinguish the wireless relay from other wireless relays and dynamic characteristics of the wireless relay that distinguish operation of the wireless relay at one time from that at another time.

68. The method according to claim 20, wherein the information indicating a capability of the wireless relay further comprises static characteristics that distinguish the wireless relay from other wireless relays and dynamic characteristics of the wireless relay that distinguish operation of the wireless relay at one time from that at another time.

69. The method according to claim 34, wherein the information indicating a capability of the wireless relay further comprises static characteristics that distinguish the wireless relay from other wireless relays and dynamic characteristics of the wireless relay that distinguish operation of the wireless relay at one time from that at another time.

70. The method according to claim 53, wherein the information indicating a capability of the wireless relay further comprises static characteristics that distinguish the wireless relay from other wireless relays and dynamic characteristics of the wireless relay that distinguish operation of the wireless relay at one time from that at another time.

* * * * *

UNITED STATES PATENT AND TRADEMARK OFFICE
CERTIFICATE OF CORRECTION

PATENT NO. : 9,066,242 B2
APPLICATION NO. : 13/643270
DATED : June 23, 2015
INVENTOR(S) : Kazmi It is certified that error appears in the above-identified patent and that said Letters Patent is hereby corrected as shown below:

In the Specification:

In Column 7, Line 34, delete "base station 505," and insert -- base station 501, --, therefor.

In Column 8, Line 55, delete "may receives" and insert -- may receive --, therefor.

In Column 10, Line 14, delete "indictor or" and insert -- indicator or --, therefor.

In Column 19, Line 25, delete "terminal acing" and insert -- terminal acting --, therefor.

In Column 20, Line 55, delete "first network node 105" and insert -- first network node 501 --, therefor.

In Column 21, Line 6, delete "target node 510, 520" and insert -- target node 501, 520 --, therefor.

In Column 21, Line 45, delete "terminal acing" and insert -- terminal acting --, therefor.

In Column 21, Line 66, delete "target node 510, 520" and insert -- target node 501, 520 --, therefor.

In Column 22, Line 14, delete "target node 510, 520" and insert -- target node 501, 520 --, therefor.

In Column 22, Lines 31-32, delete "target node 510, 520," and insert -- target node 501, 520, --, therefor.

In Column 23, Line 58, delete "terminal acing" and insert -- terminal acting --, therefor.

In Column 25, Line 64, delete "terminal acing" and insert -- terminal acting --, therefor.

Signed and Sealed this
Second Day of August, 2016

Michelle K. Lee
*Director of the United States Patent and Trademark Office*

CERTIFICATE OF CORRECTION (continued)
U.S. Pat. No. 9,066,242 B2

In Column 26, Lines 62-63, delete "second network node 501" and insert -- second network node 520 --, therefor.

In Column 27, Line 1, delete "target node 501, 510." and insert -- target node 501, 520. --, therefor.

In Column 27, Line 21, delete "a attribute" and insert -- an attribute --, therefor.

In the Claims:

In Column 31, Line 15, Claim 17, delete "acing as" and insert -- acting as --, therefor.

In Column 32, Line 51, Claim 31, delete "acing as" and insert -- acting as --, therefor.

In Column 34, Line 35, Claim 50, delete "acing as" and insert -- acting as --, therefor.

In Column 36, Line 23, Claim 64, delete "acing as" and insert -- acting as --, therefor.